US011412323B2

(12) United States Patent
Youn et al.

(10) Patent No.: US 11,412,323 B2
(45) Date of Patent: Aug. 9, 2022

(54) DISPLAY DEVICE

(71) Applicant: LG ELECTRONICS INC., Seoul (KR)

(72) Inventors: Hyunseung Youn, Seoul (KR); Sungeun Yang, Seoul (KR); Seokhee Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 70 days.

(21) Appl. No.: 16/966,843

(22) PCT Filed: May 31, 2018

(86) PCT No.: PCT/KR2018/006226
§ 371 (c)(1),
(2) Date: Jul. 31, 2020

(87) PCT Pub. No.: WO2019/151582
PCT Pub. Date: Aug. 8, 2019

(65) Prior Publication Data
US 2021/0044895 A1 Feb. 11, 2021

(30) Foreign Application Priority Data
Jan. 31, 2018 (KR) .................. 10-2018-0012358

(51) Int. Cl.
*H04R 1/34* (2006.01)
*H04R 1/02* (2006.01)
*G06F 1/16* (2006.01)

(52) U.S. Cl.
CPC ........... *H04R 1/345* (2013.01); *G06F 1/1605* (2013.01); *H04R 1/025* (2013.01)

(58) Field of Classification Search
CPC ........ H04R 1/345; H04R 1/025; G06F 1/1605
USPC ........................................... 381/386
See application file for complete search history.

(56) References Cited

U.S. PATENT DOCUMENTS

| 6,257,365 B1 | 7/2001 | Hulsebus, II |
| 2005/0129263 A1 | 6/2005 | Tamura et al. |
| 2014/0307421 A1 | 10/2014 | Lee et al. |
| 2015/0053497 A1 | 2/2015 | Horiuchi |

FOREIGN PATENT DOCUMENTS

| JP | 2008211381 | 9/2008 |
| JP | 2013191995 | 9/2013 |
| KR | 10-2009-0079292 | 7/2019 |

OTHER PUBLICATIONS

PCT International Application No. PCT/KR2018/006226, International Search Report dated Oct. 31, 2018, 4 pages.
European Patent Office Application Serial No. 18904213.8, Search Report dated Sep. 22, 2021, 8 pages.

*Primary Examiner* — Sean H Nguyen
(74) *Attorney, Agent, or Firm* — Lee Hong Degerman Kang & Waimey

(57) ABSTRACT

A display device is disclosed. The display device comprises: a display panel having a lower side; a speaker, positioned in the rear of the display panel and adjacent to the lower side of the display panel, for providing sound from the lower side of the display panel downward; and a reflector for reflecting the sound provided by the speaker forward, wherein the reflector covers the lower side of the display panel, extends along the lower side of the display panel, has an inner surface facing the speaker, and has a stepped shape which protrudes from the inner surface and extends along the lower side of the display panel.

14 Claims, 39 Drawing Sheets

[FIG. 1]
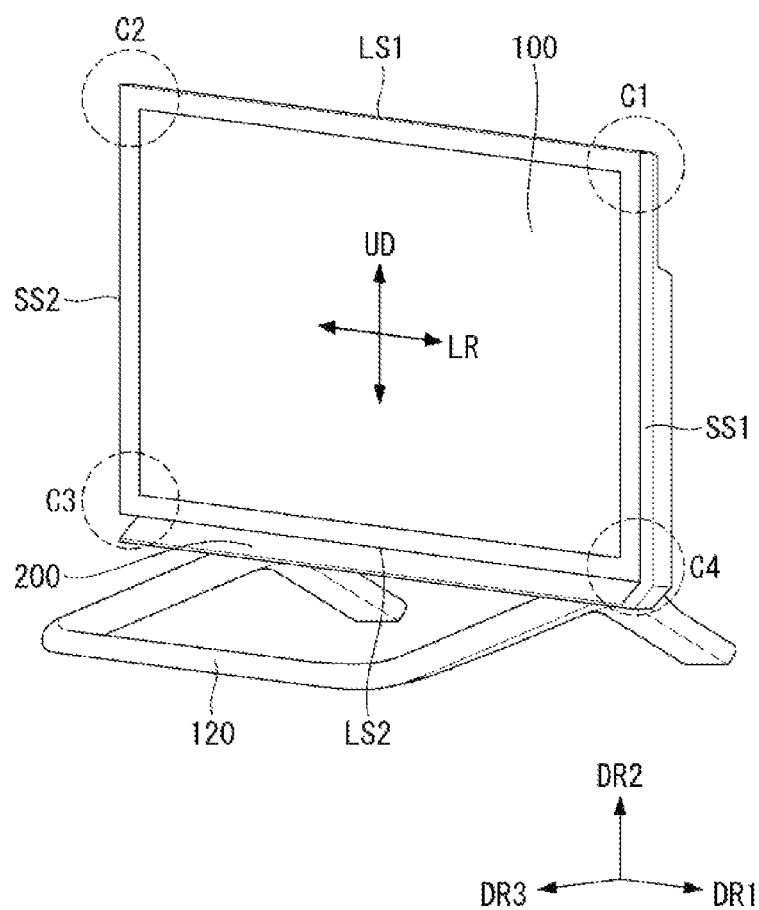

[FIG. 2]
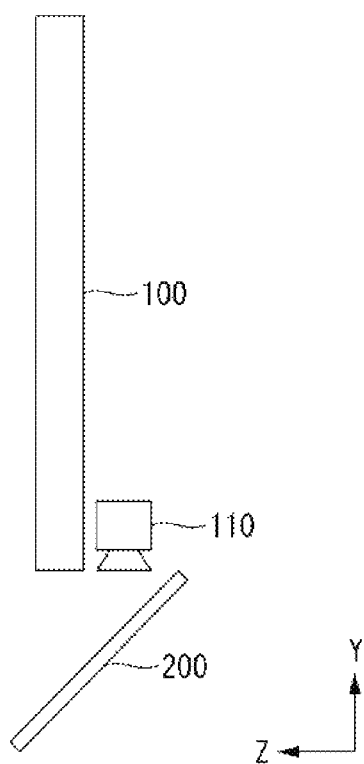

[FIG. 3]
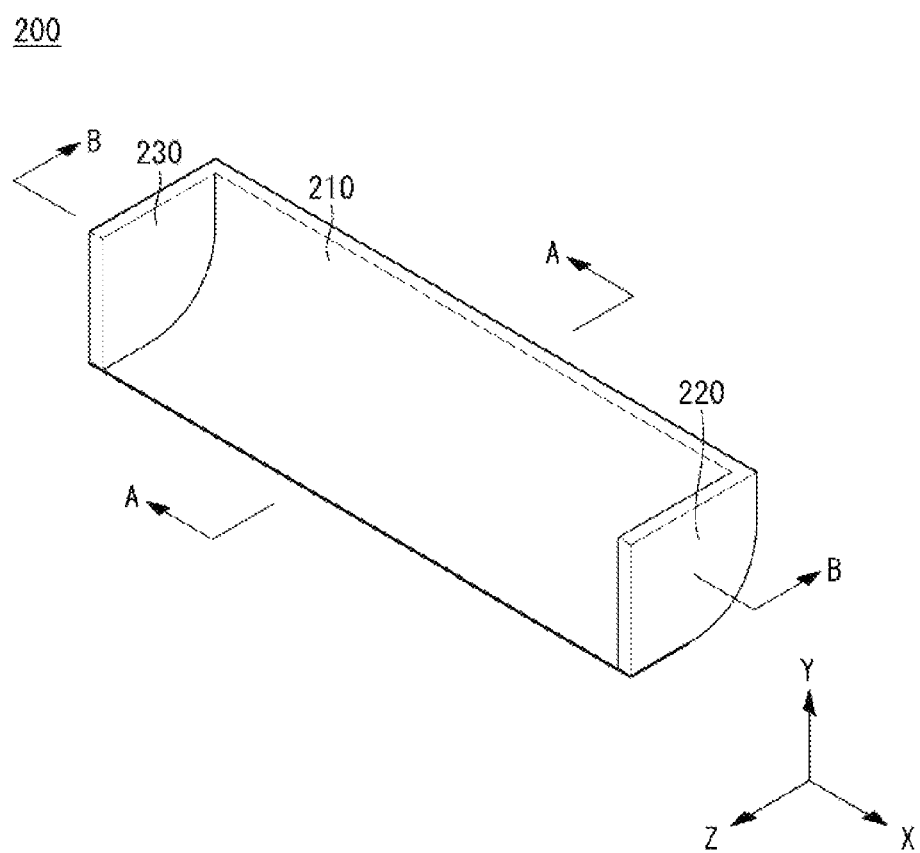

【FIG. 4】
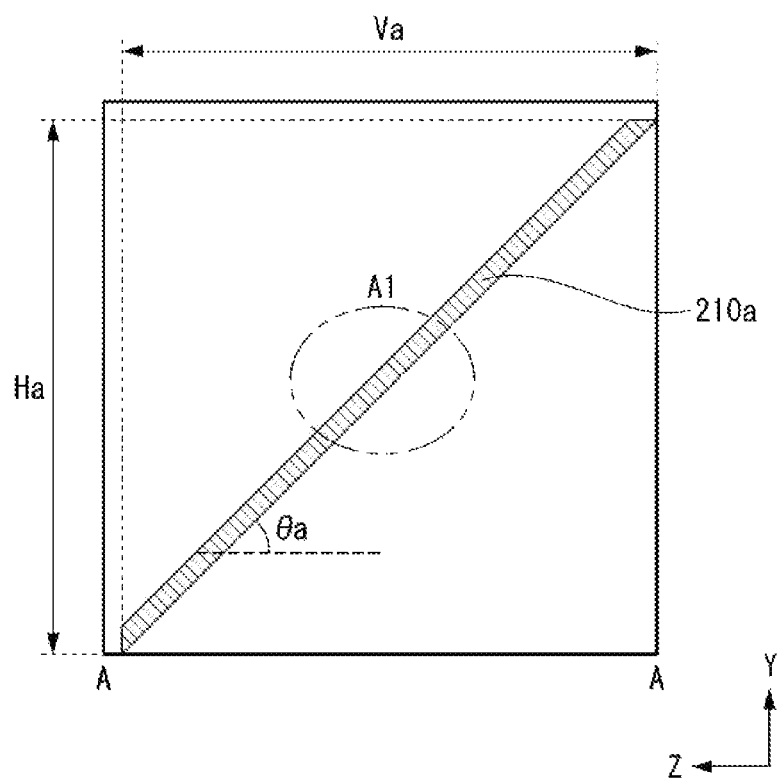

【FIG. 5】
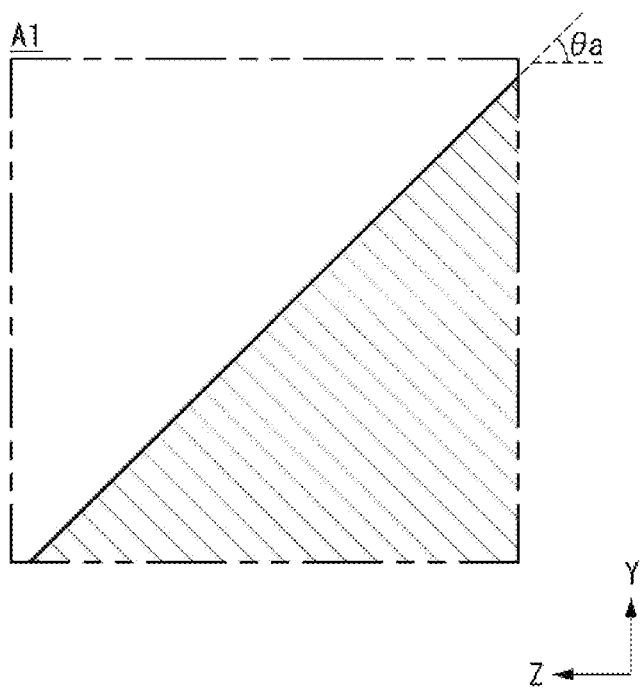

【FIG. 6】
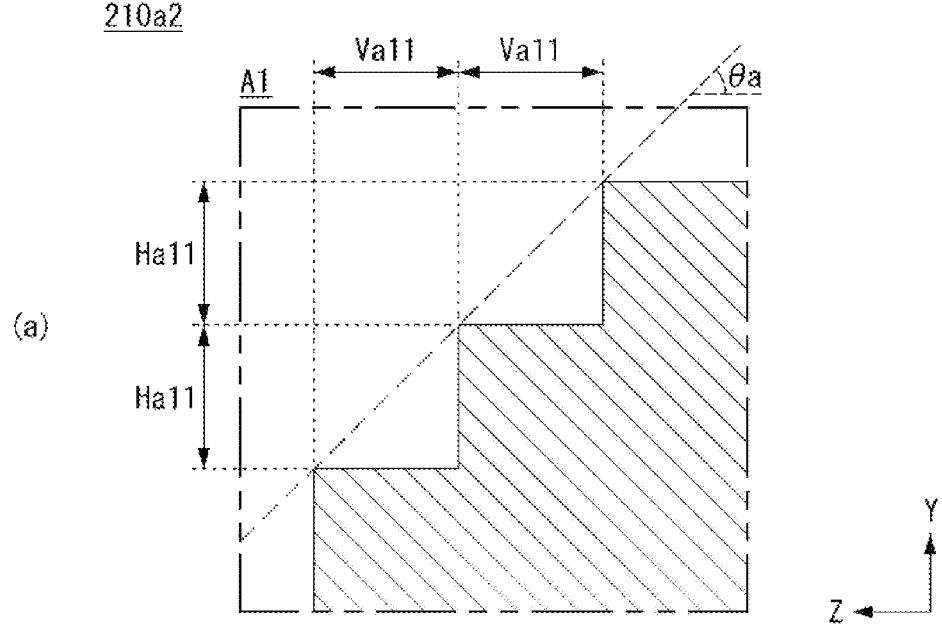
(a)
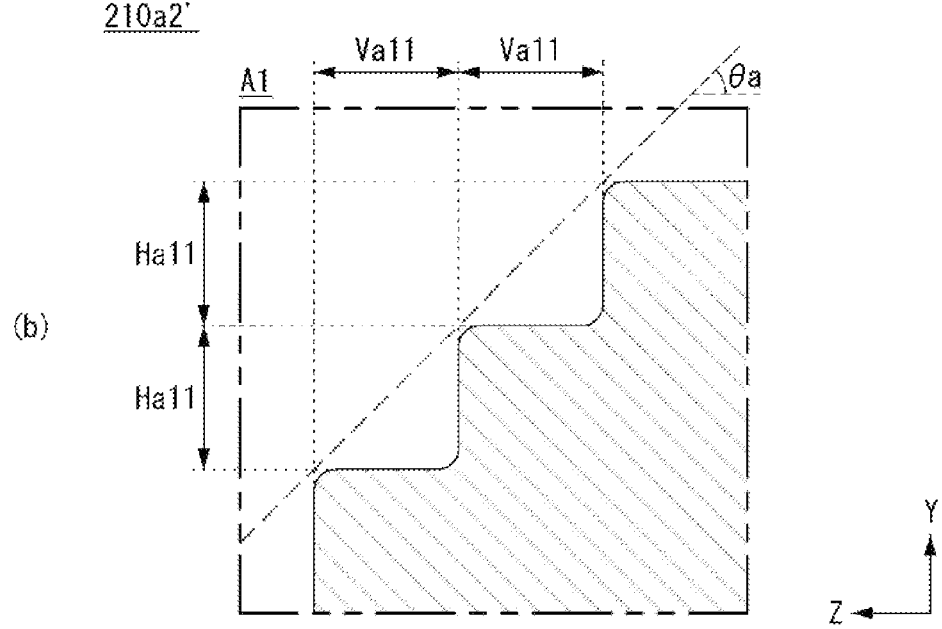
(b)

【FIG. 7】
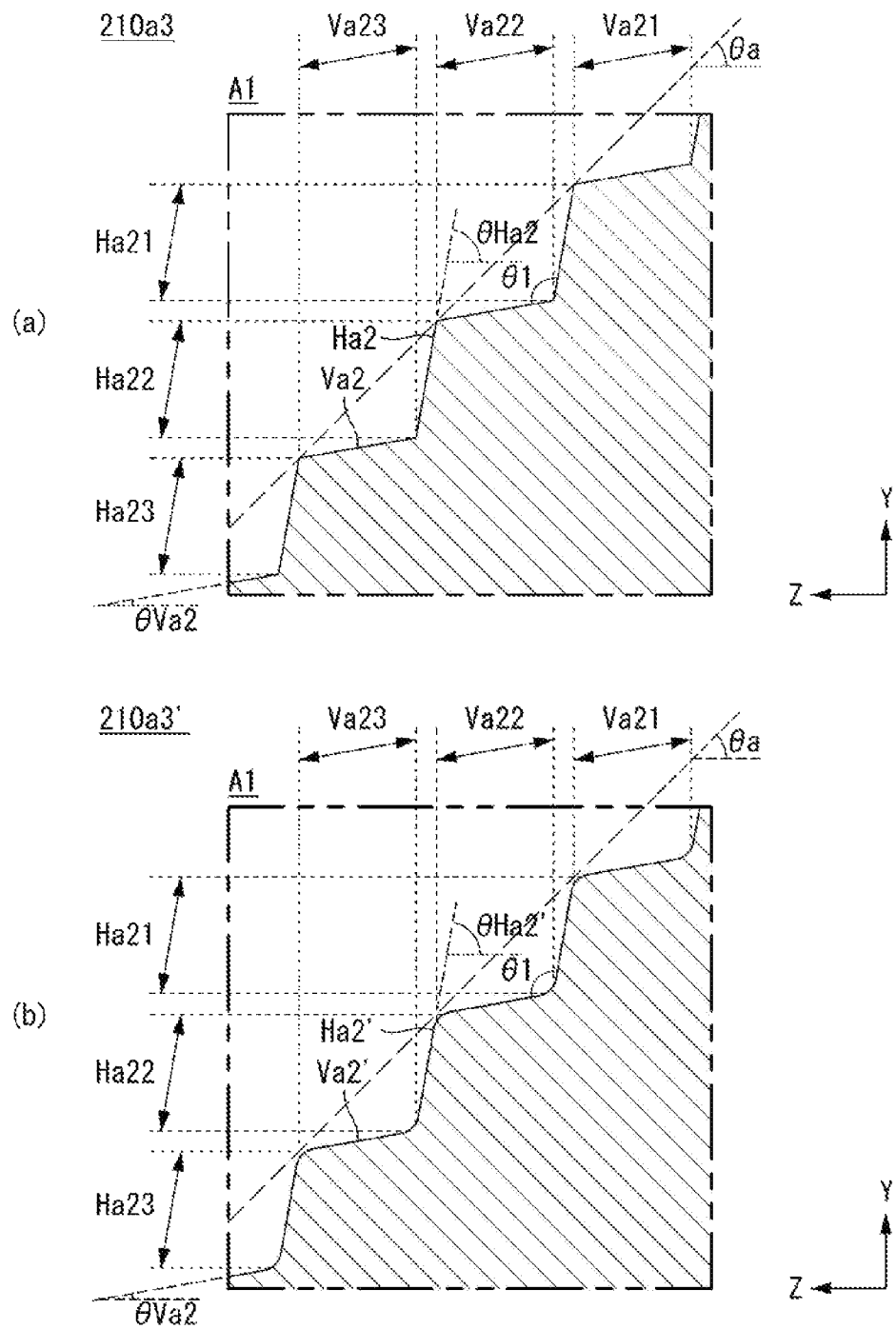

【FIG. 8】
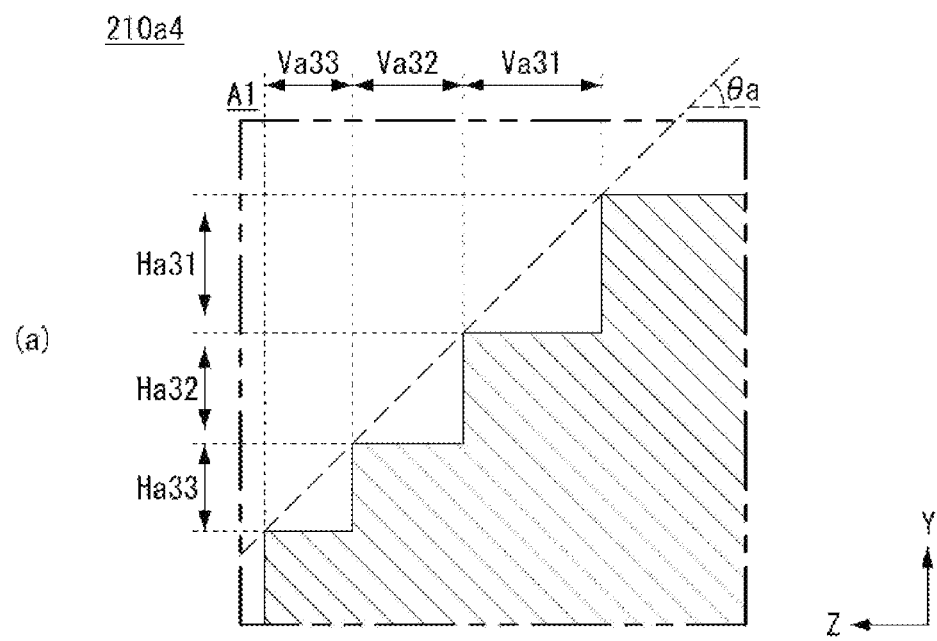
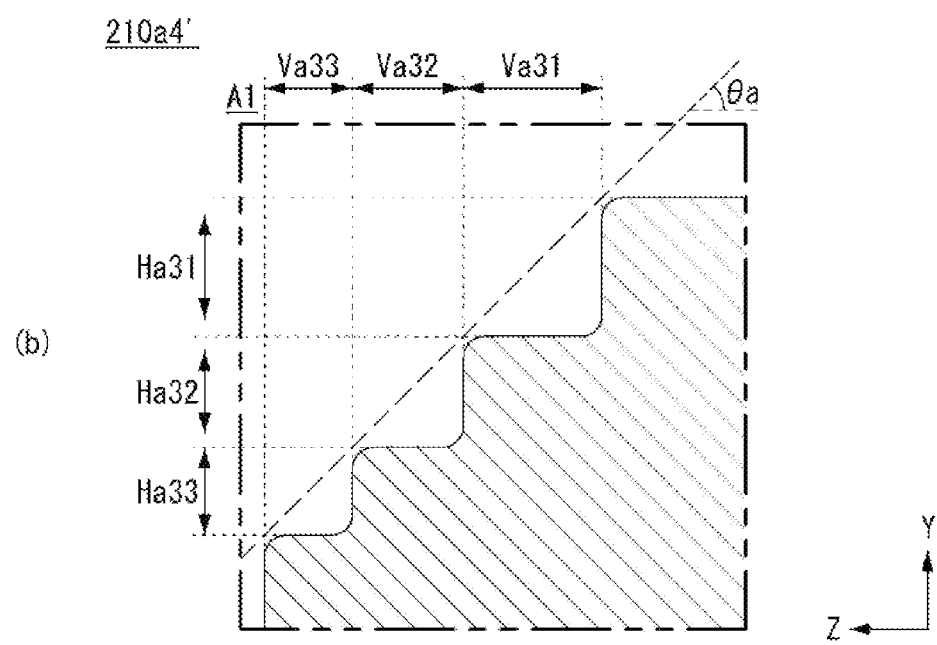

[FIG. 9]
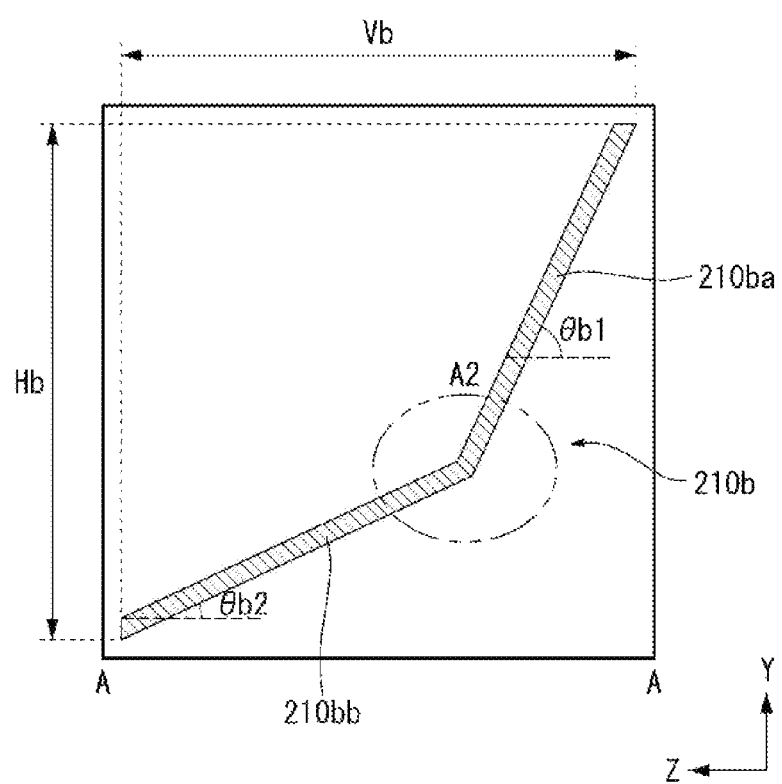

[FIG. 10]
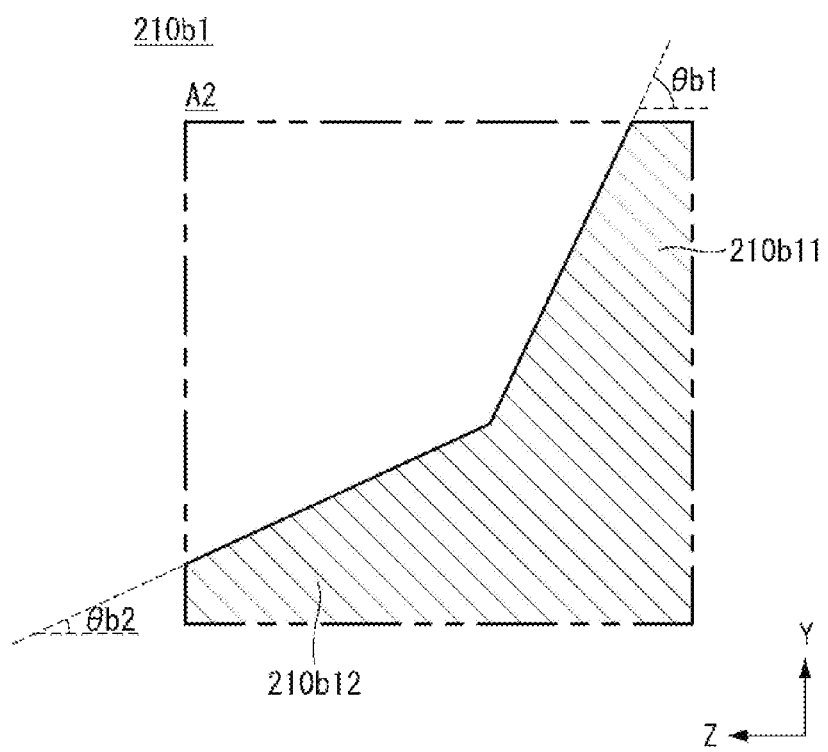

【FIG. 11】
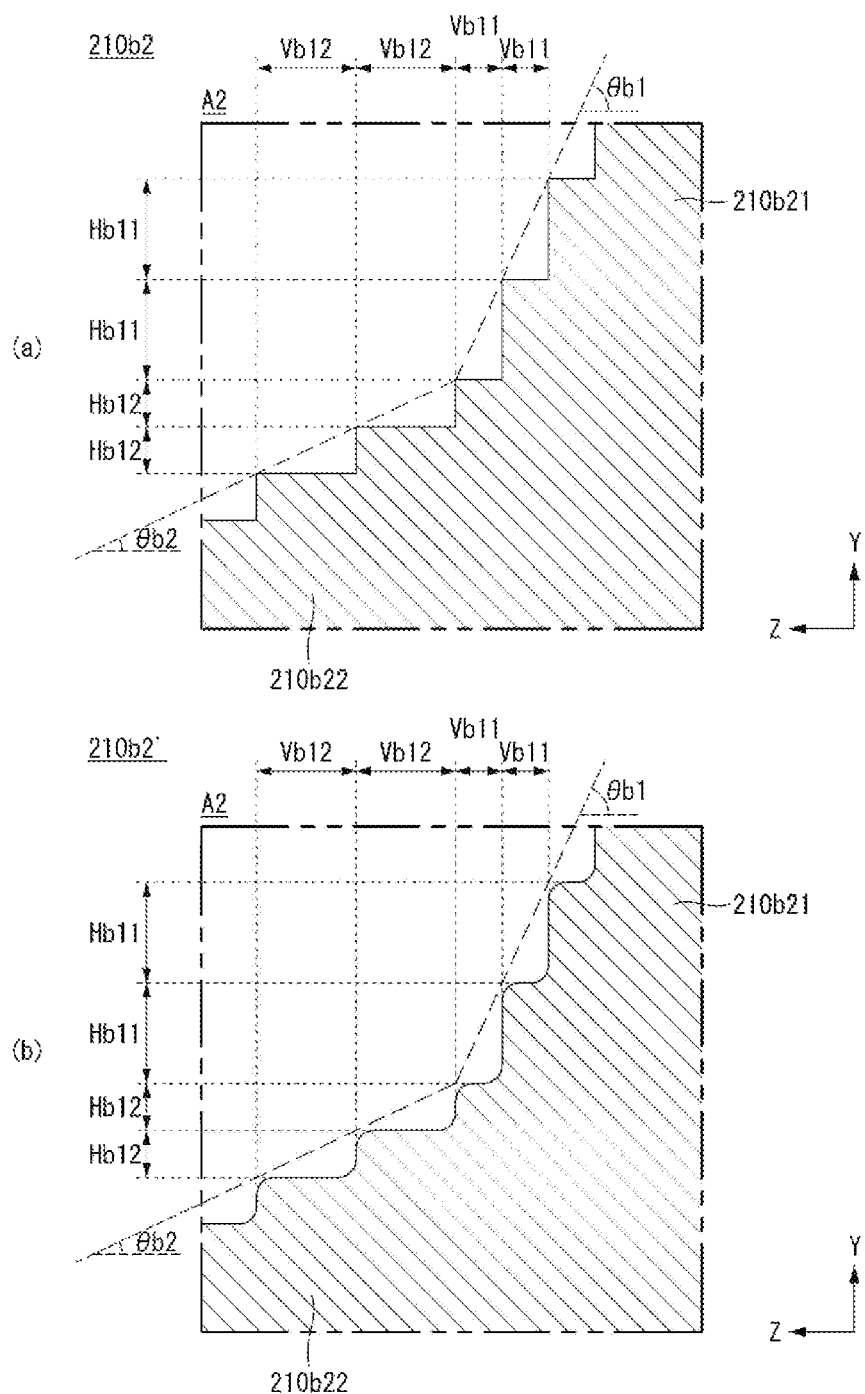

【FIG. 12】
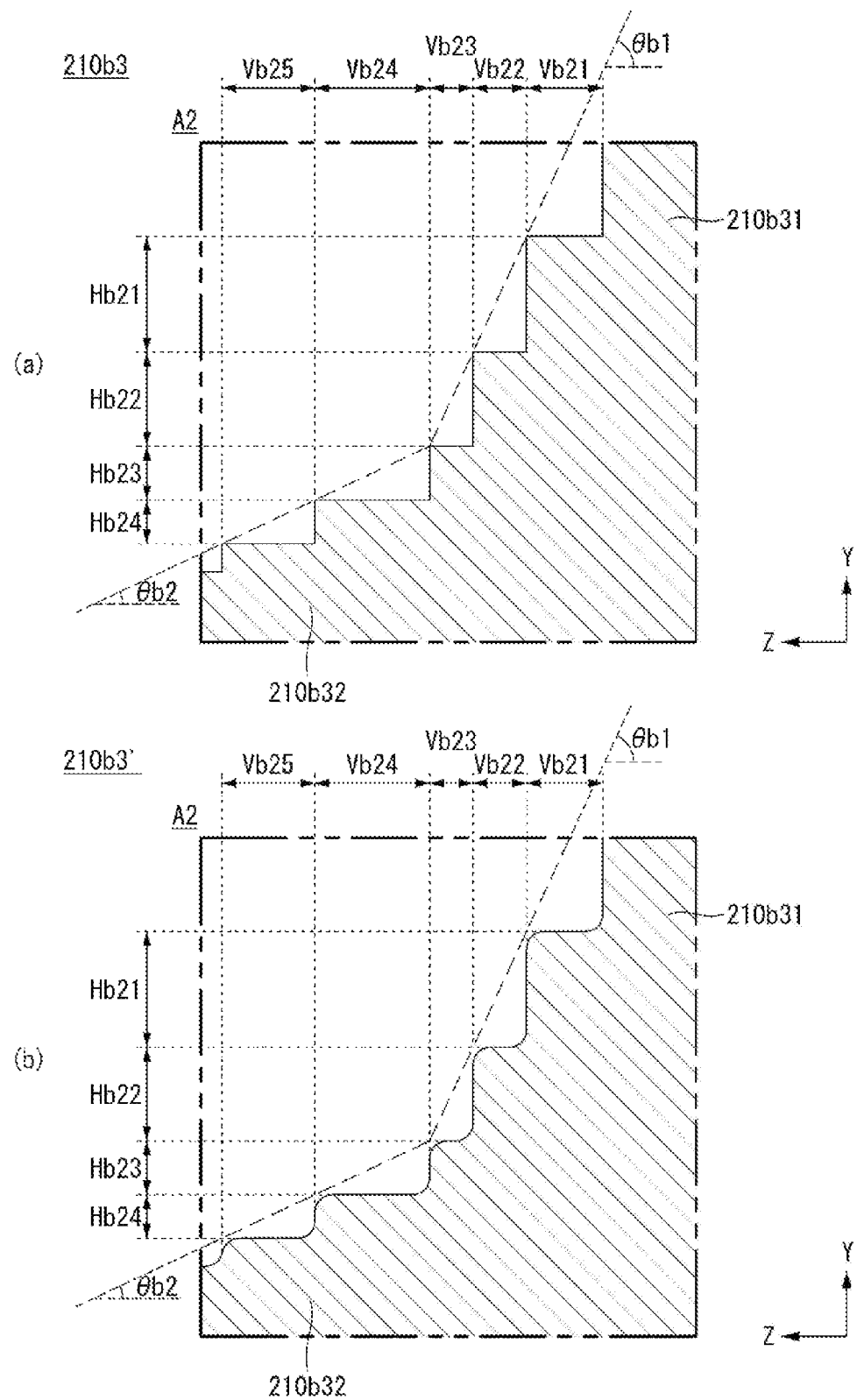

【FIG. 13】
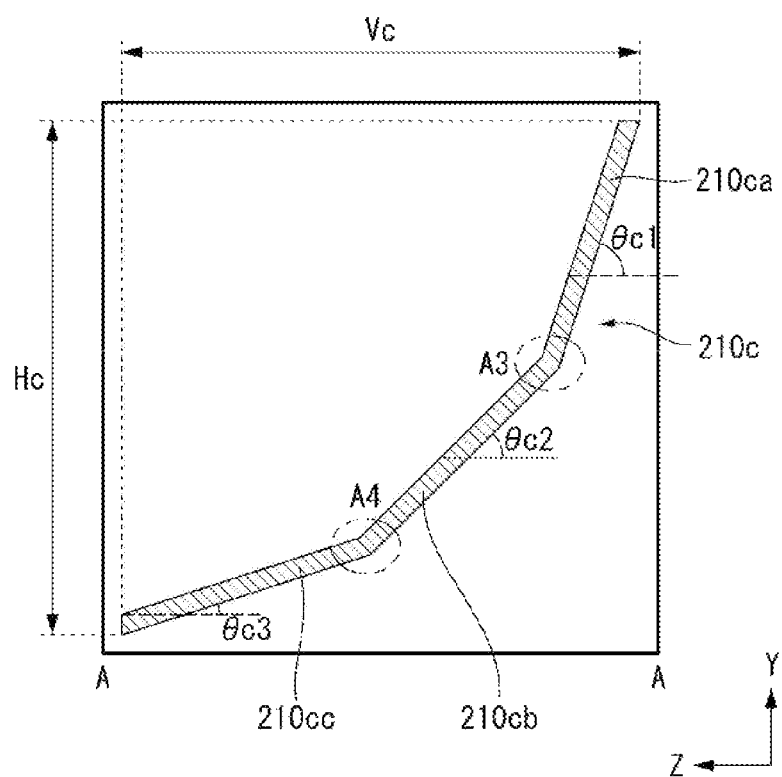

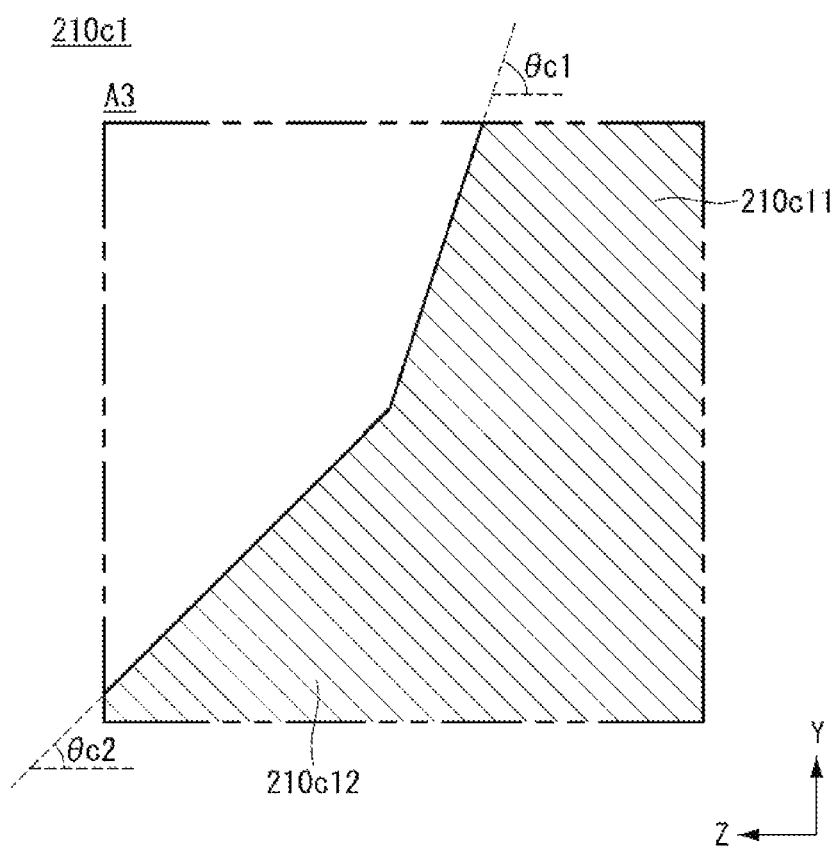
[FIG. 14]

【FIG. 15】
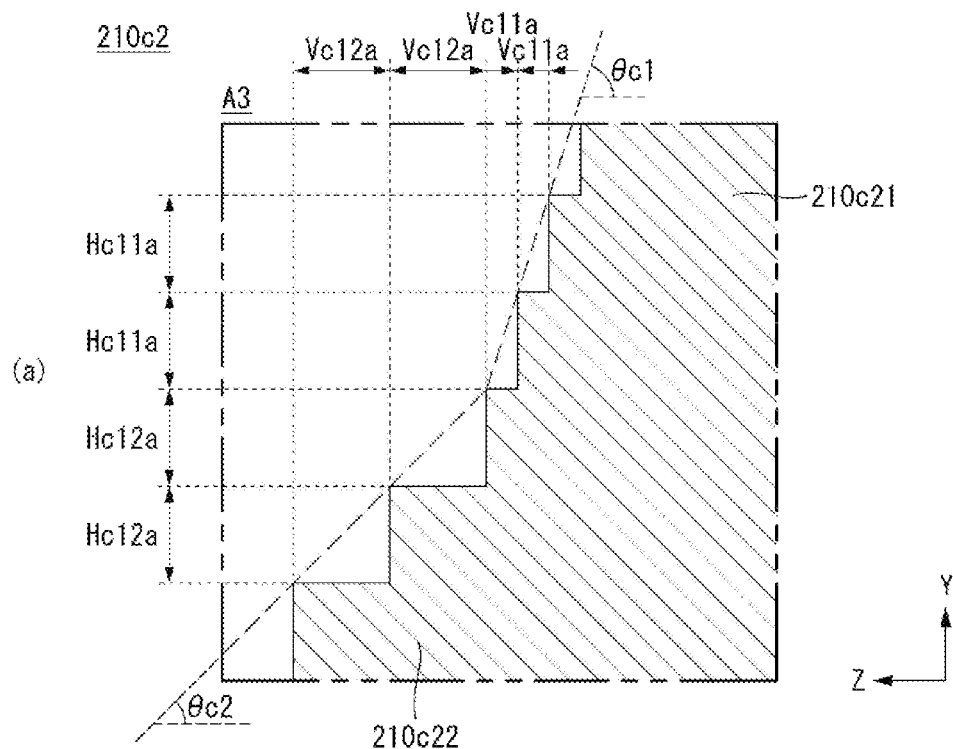
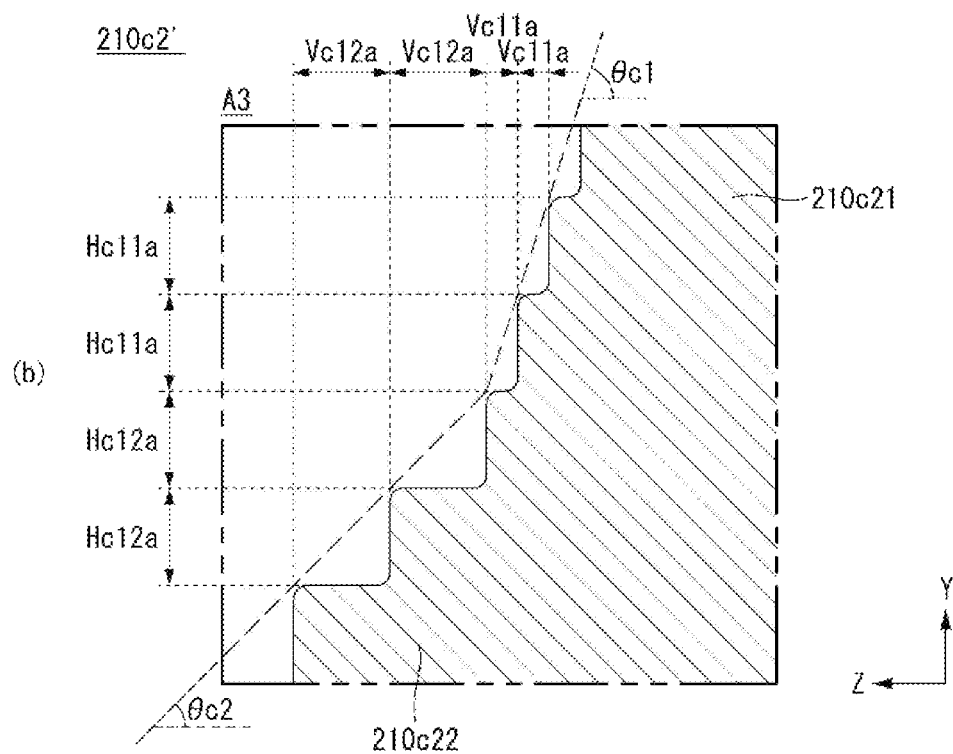

【FIG. 16】
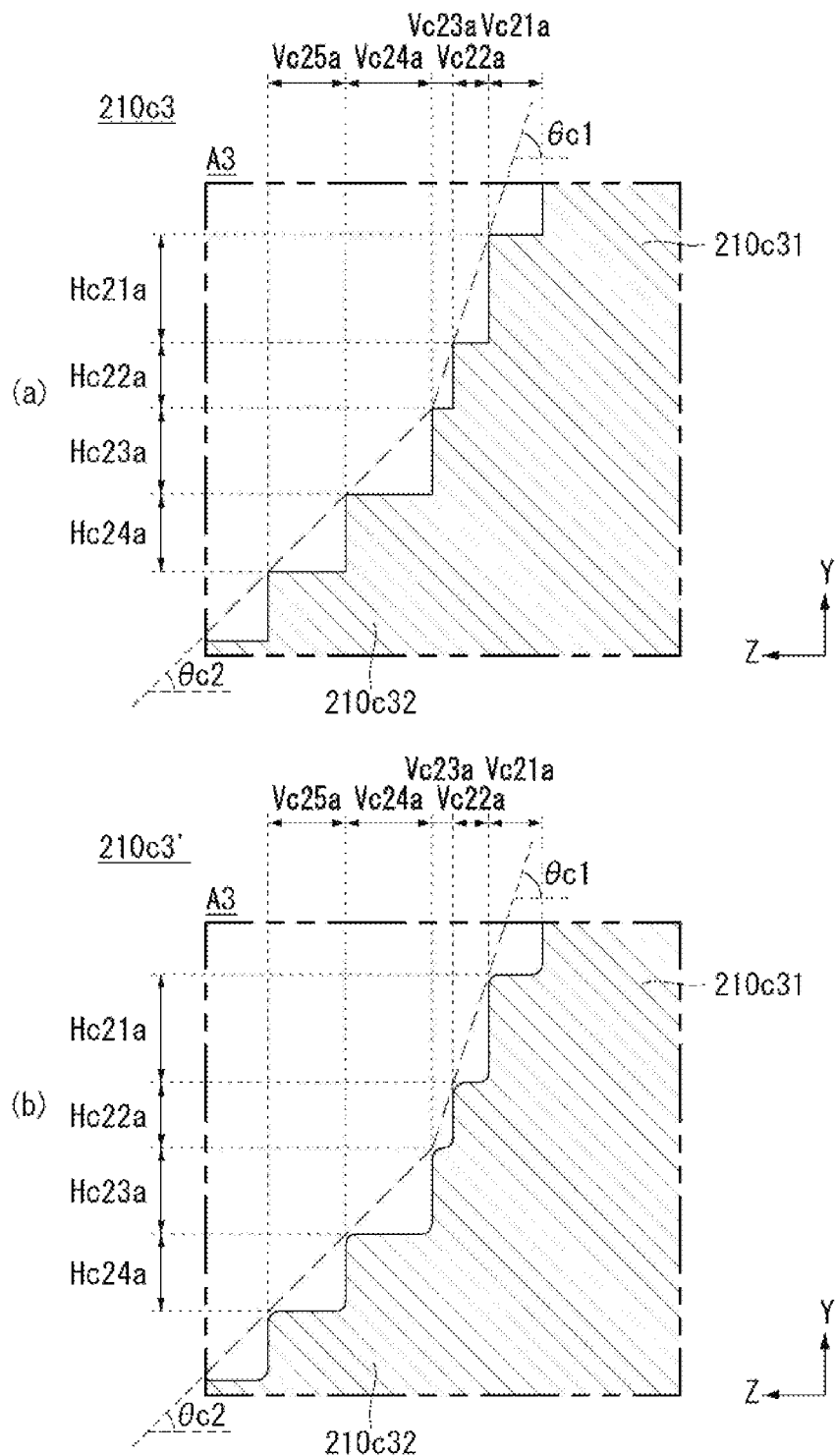

[FIG. 17]
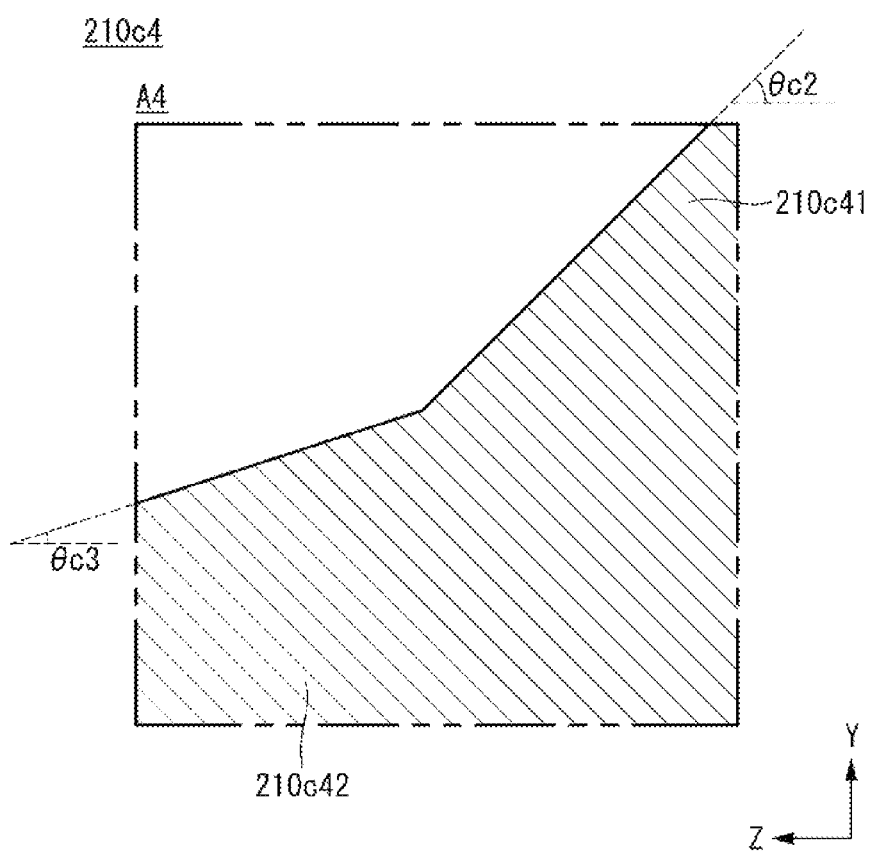

【FIG. 18】
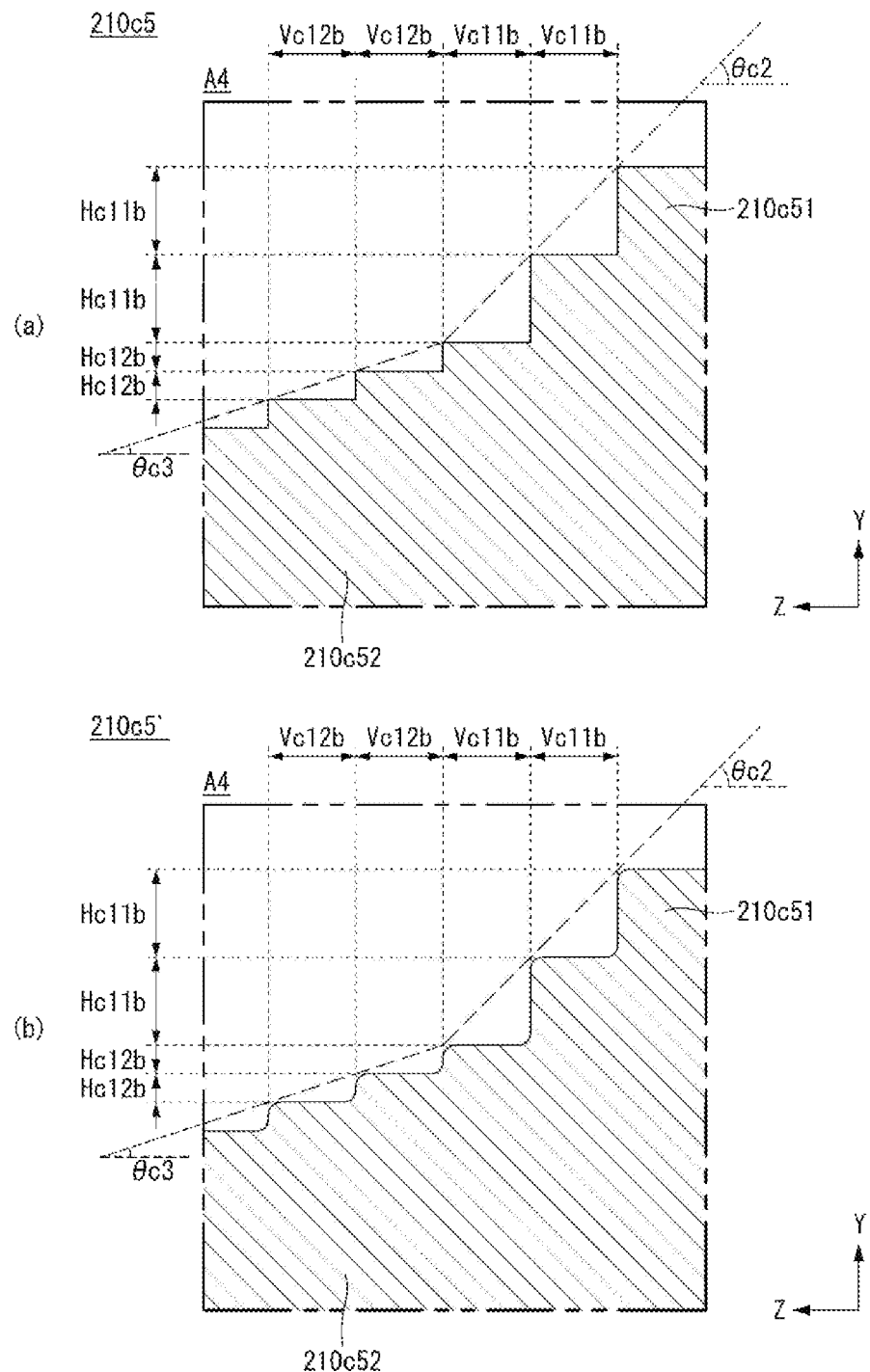

【FIG. 19】
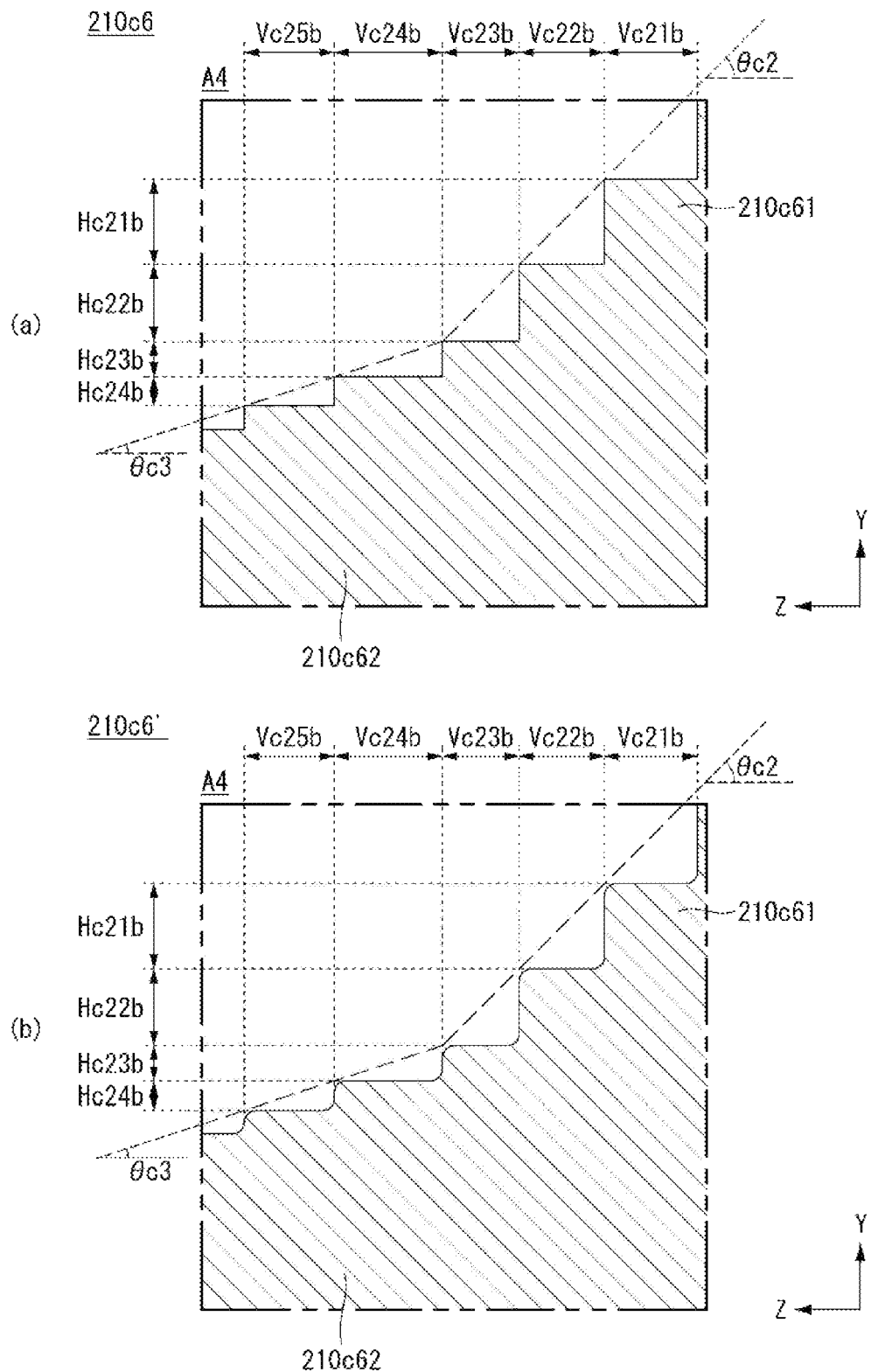

【FIG. 20】
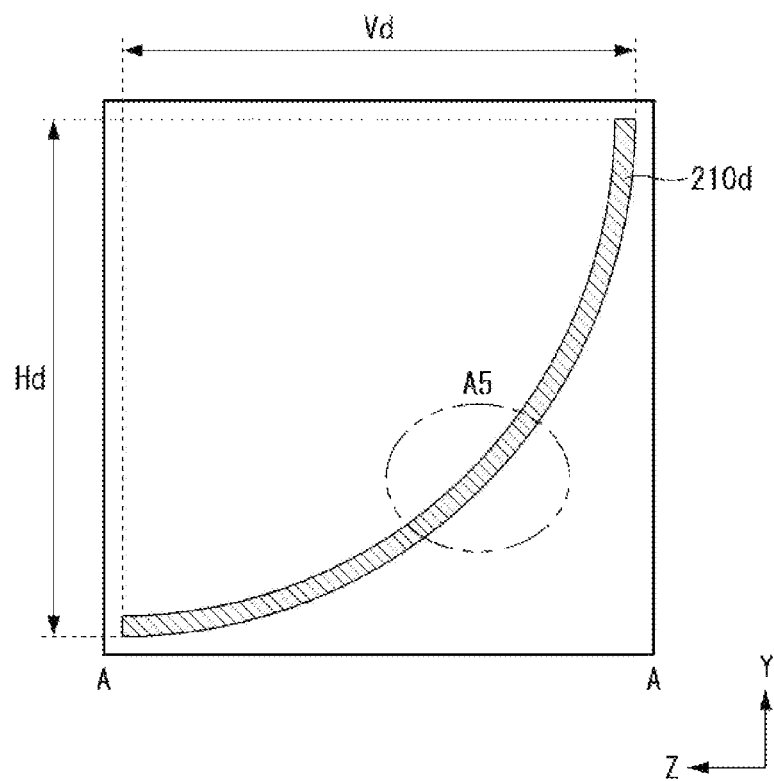

【FIG. 21】
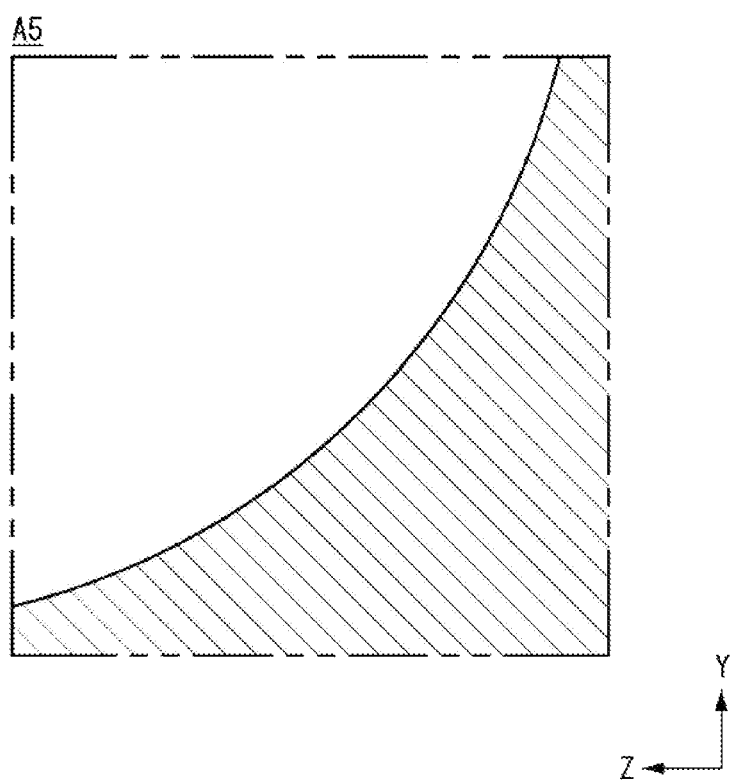

[FIG. 22]
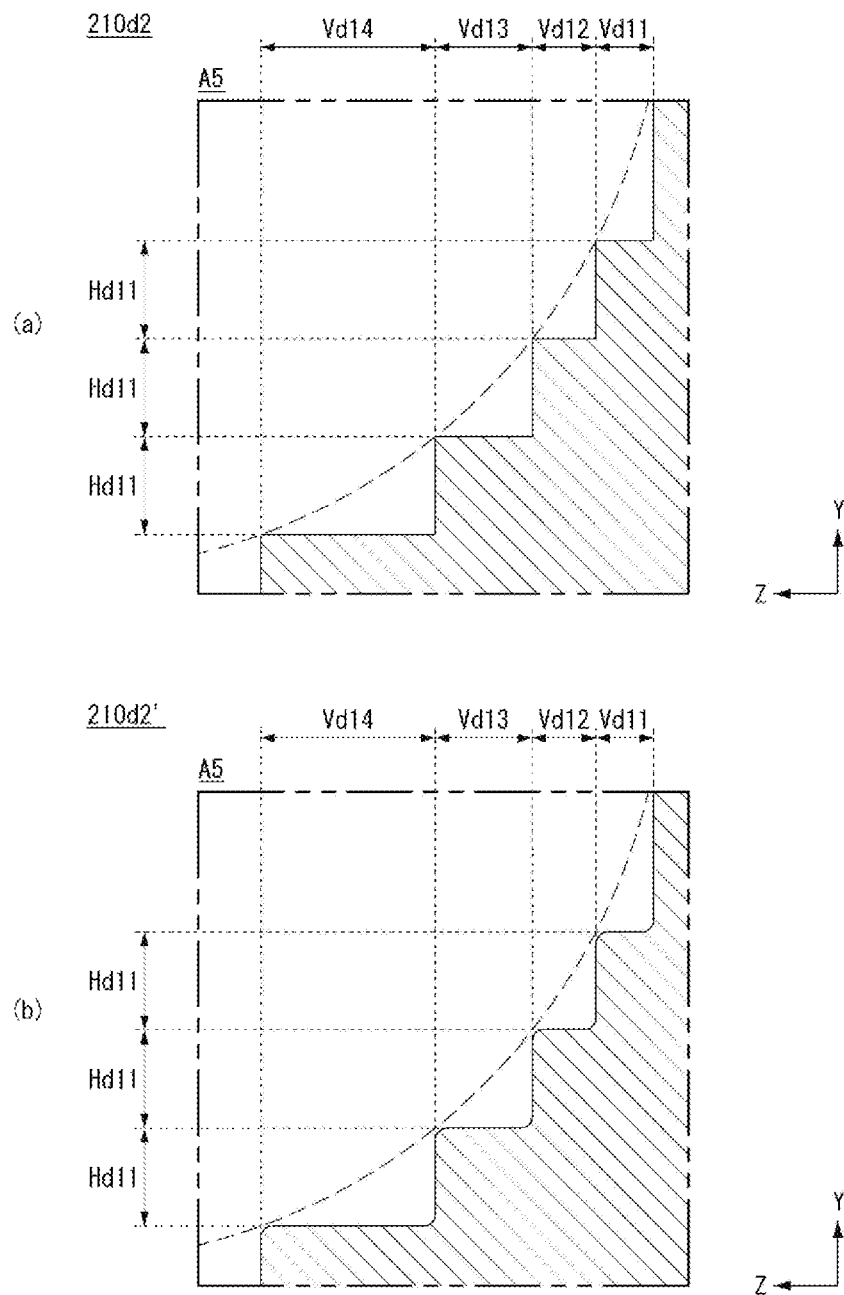

[FIG. 23]
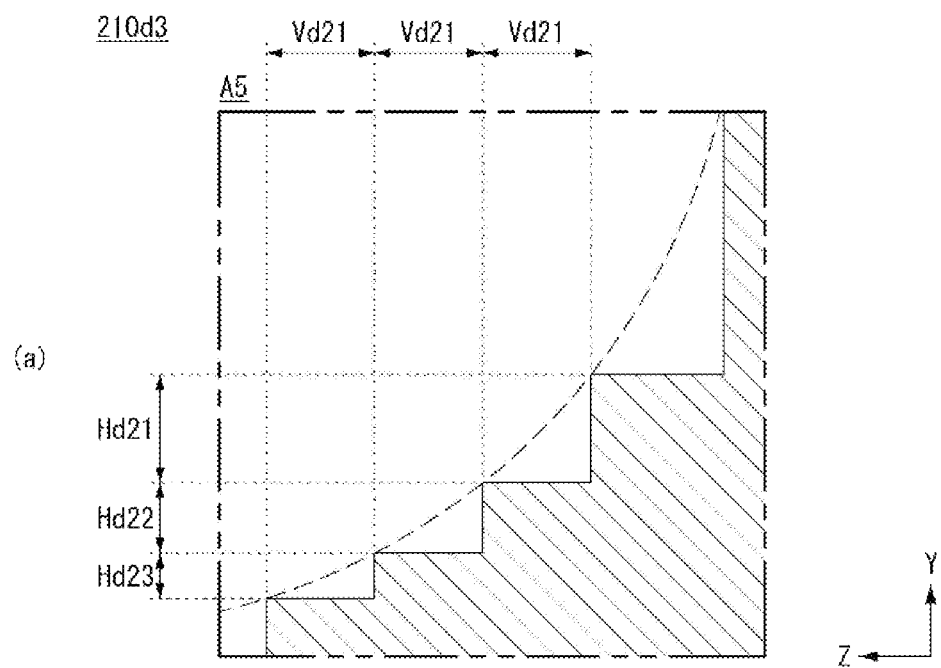
(a)
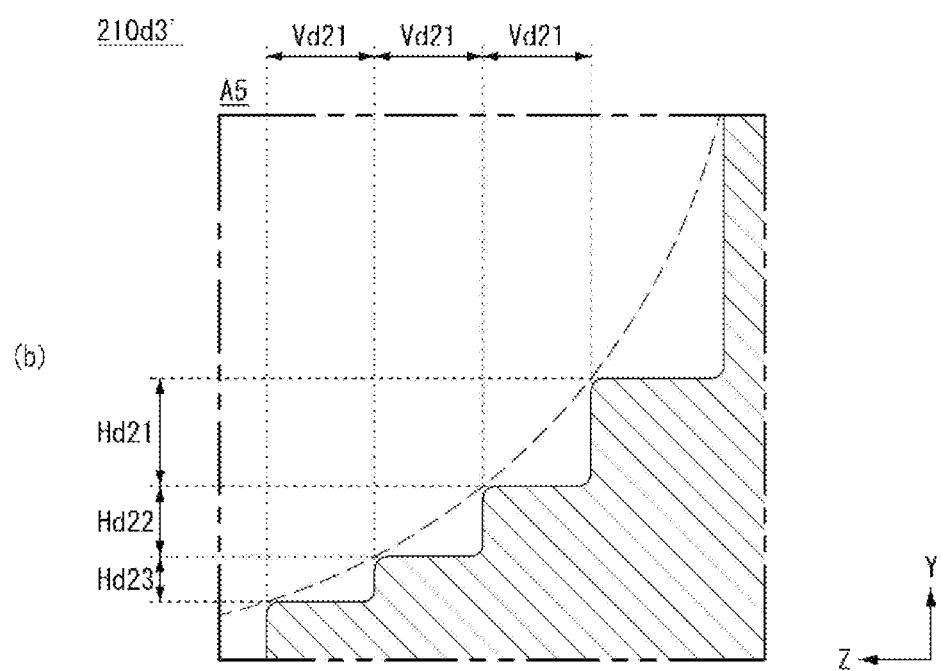
(b)

【FIG. 24】
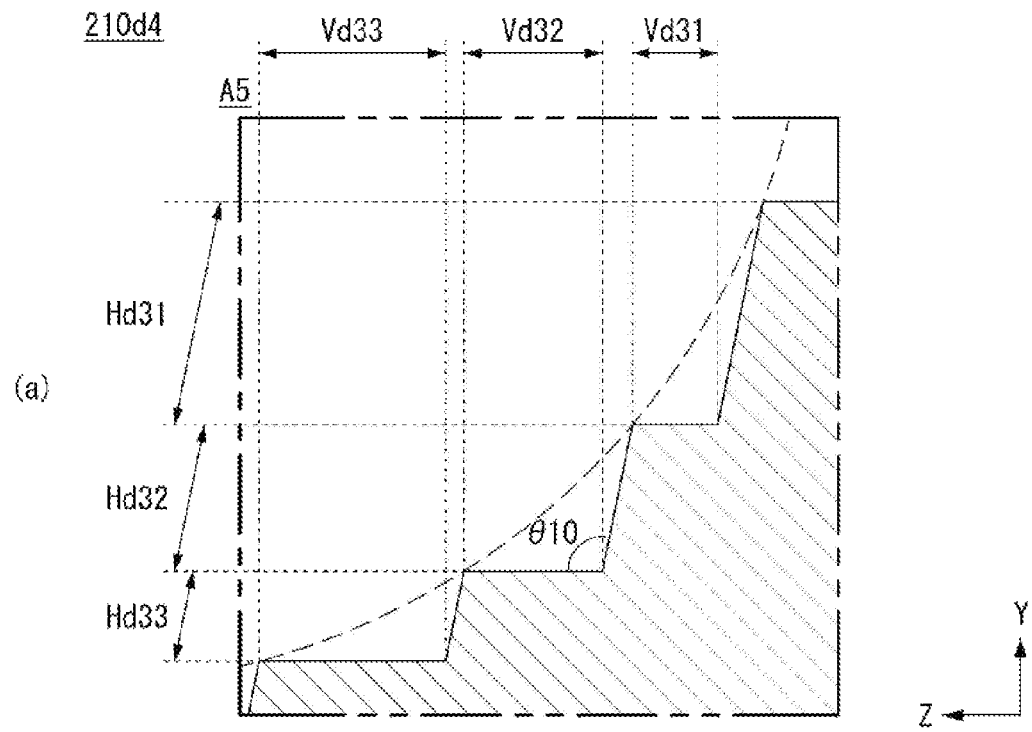
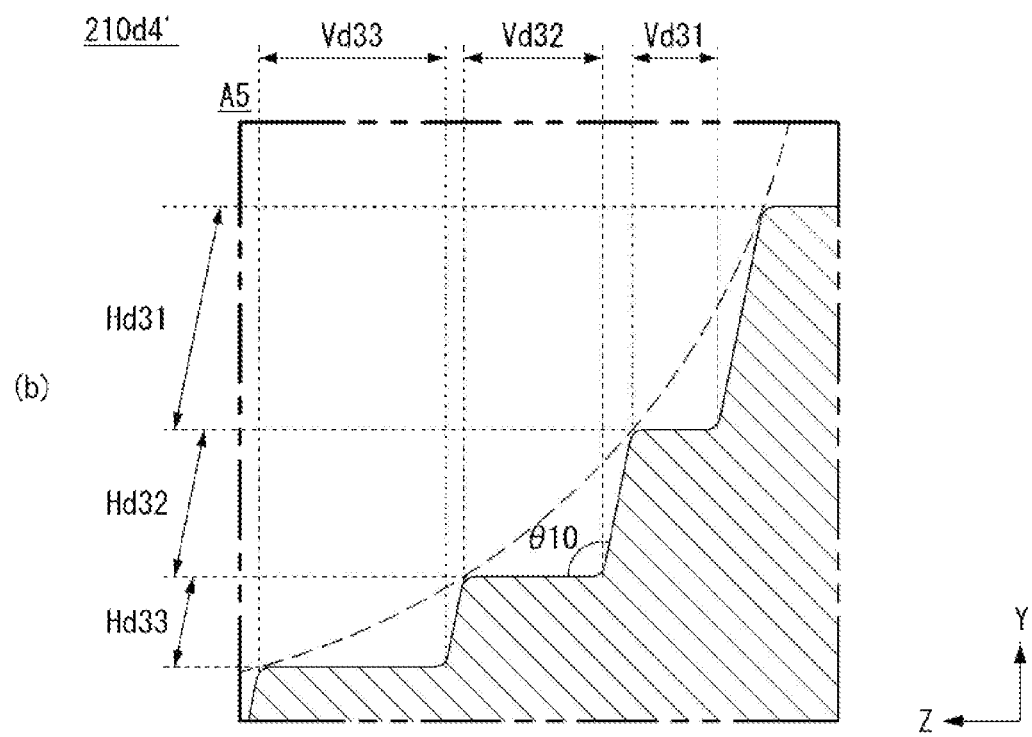

【FIG. 25】
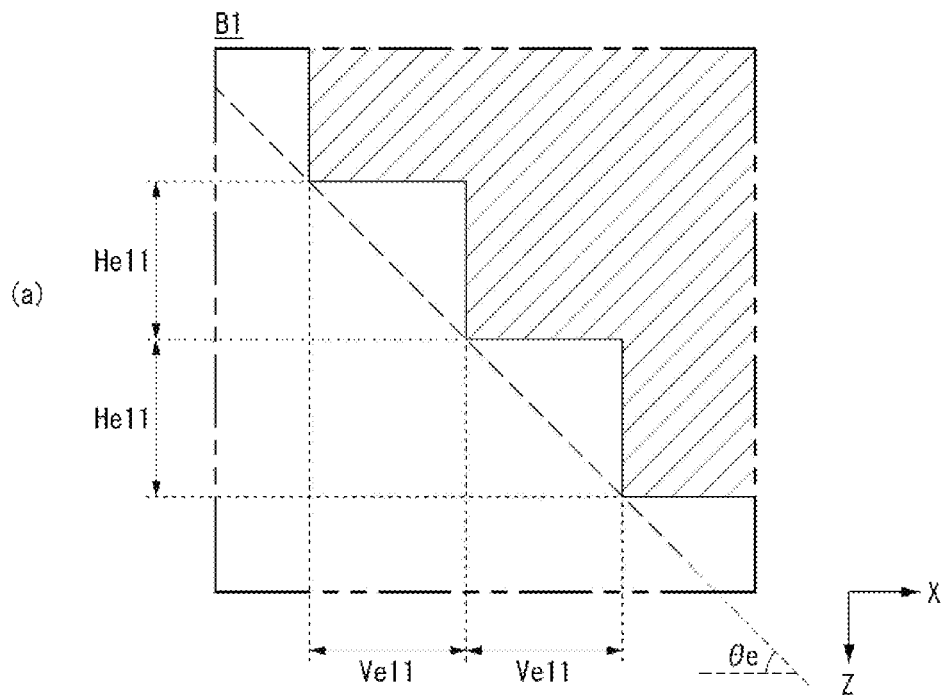
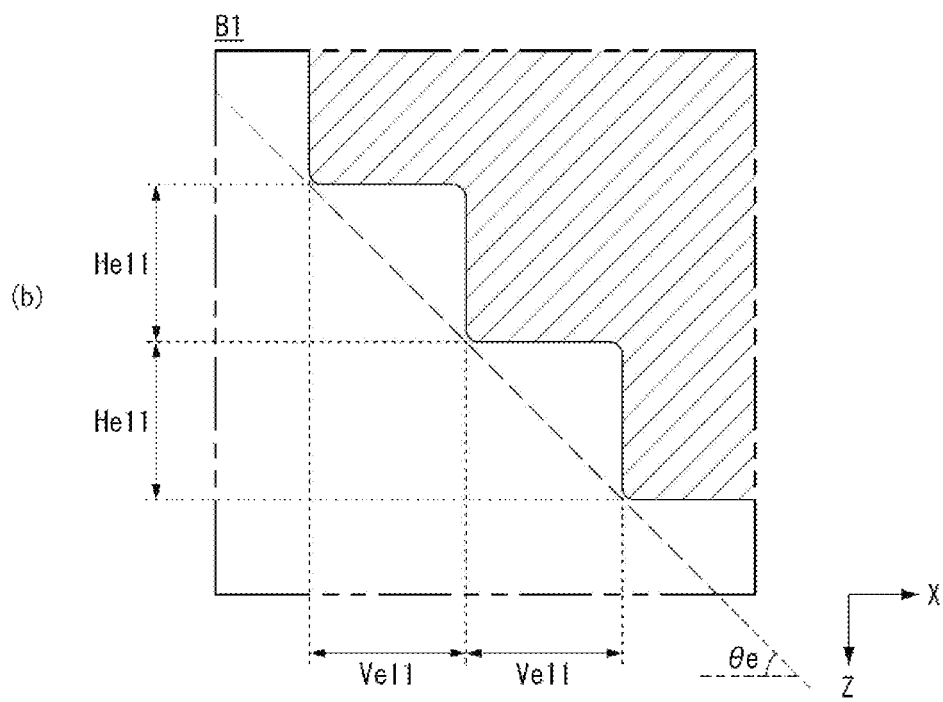

[FIG. 26]
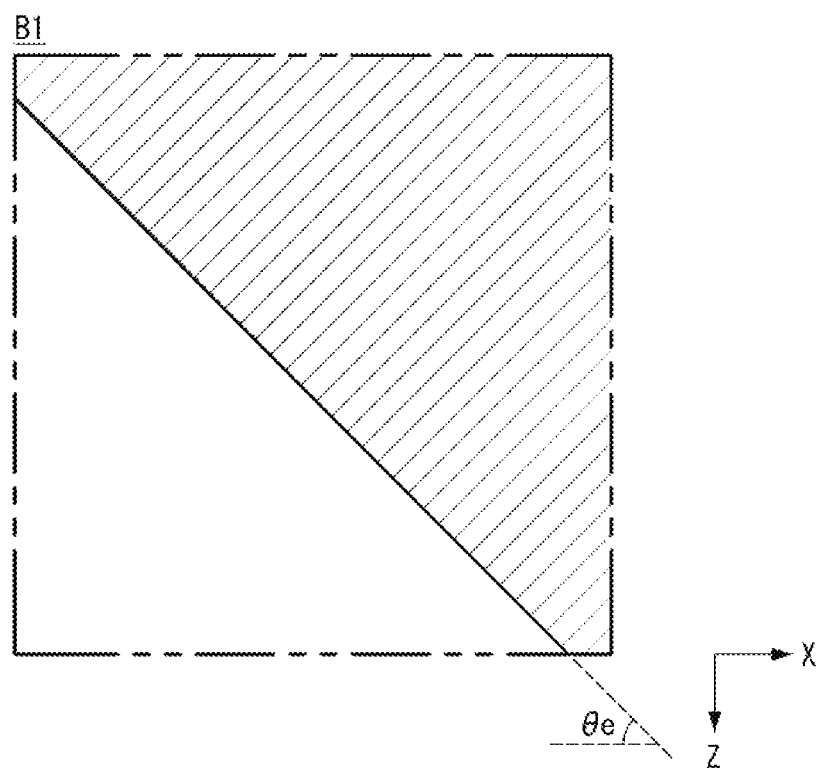

[FIG. 27]
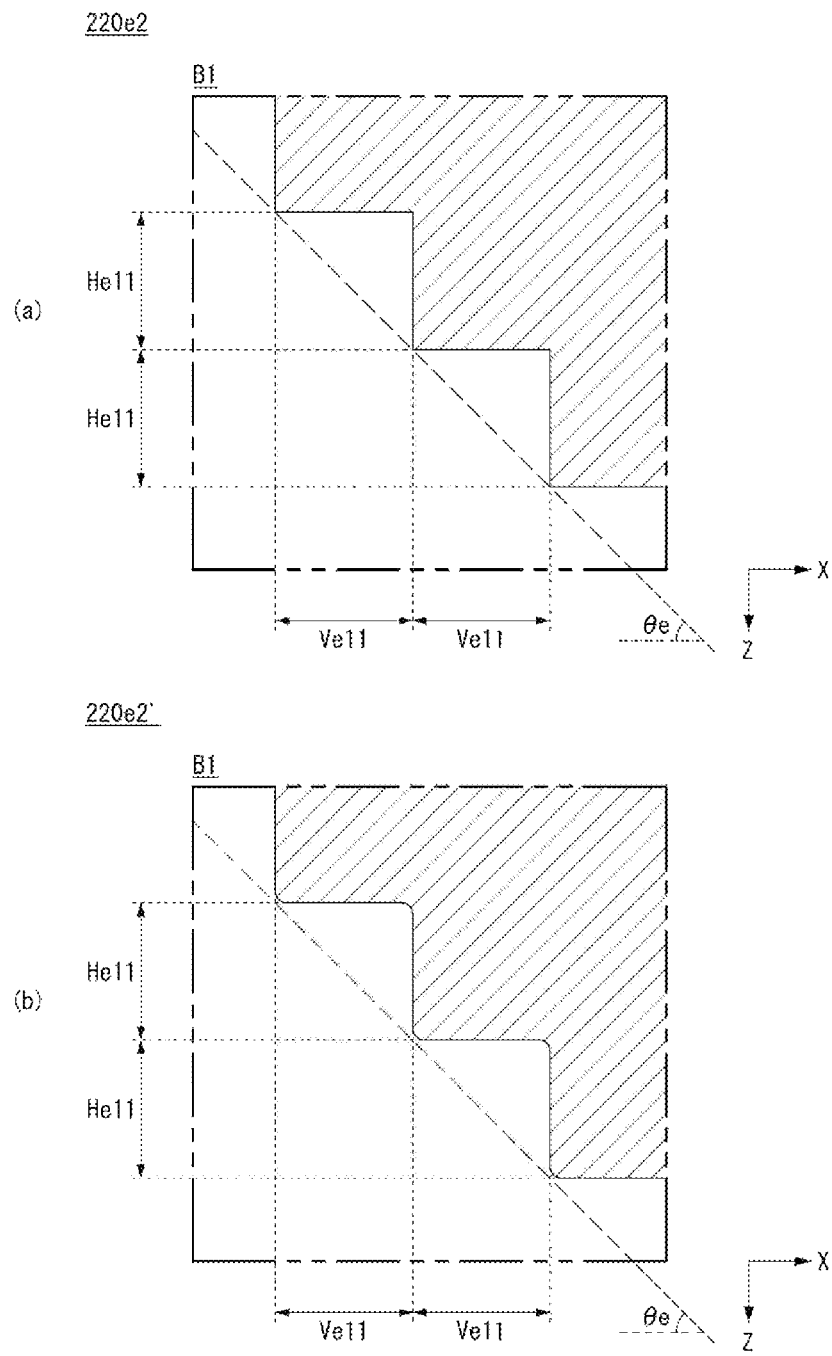

【FIG. 28】
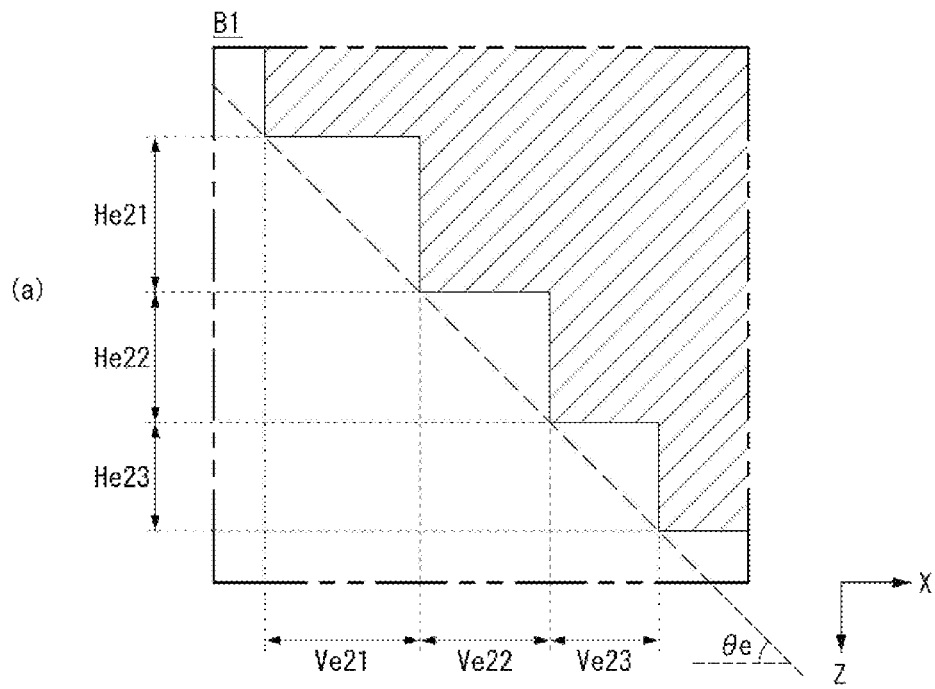
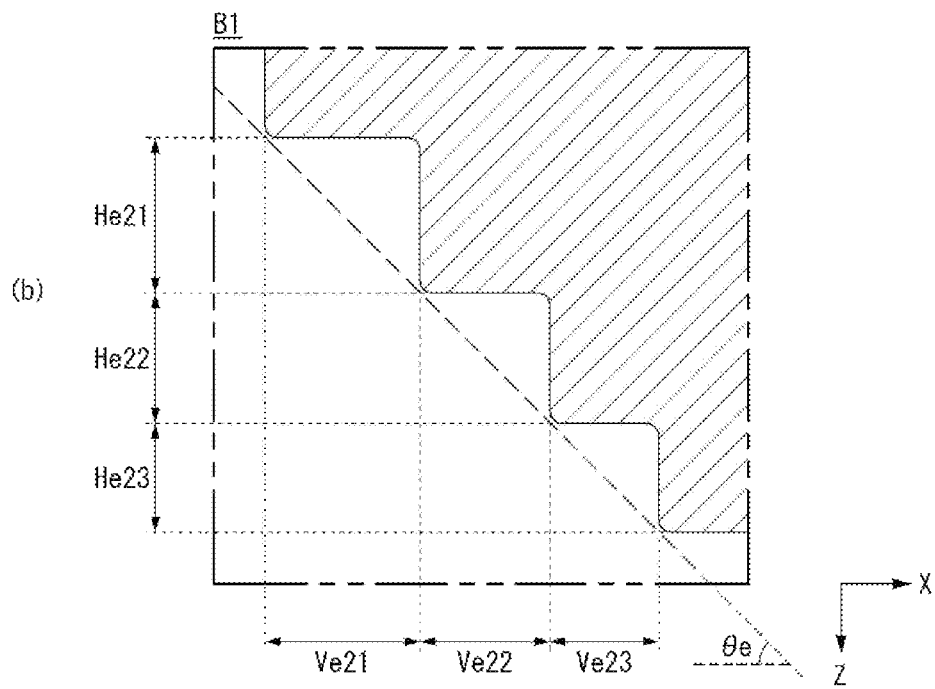

【FIG. 29】
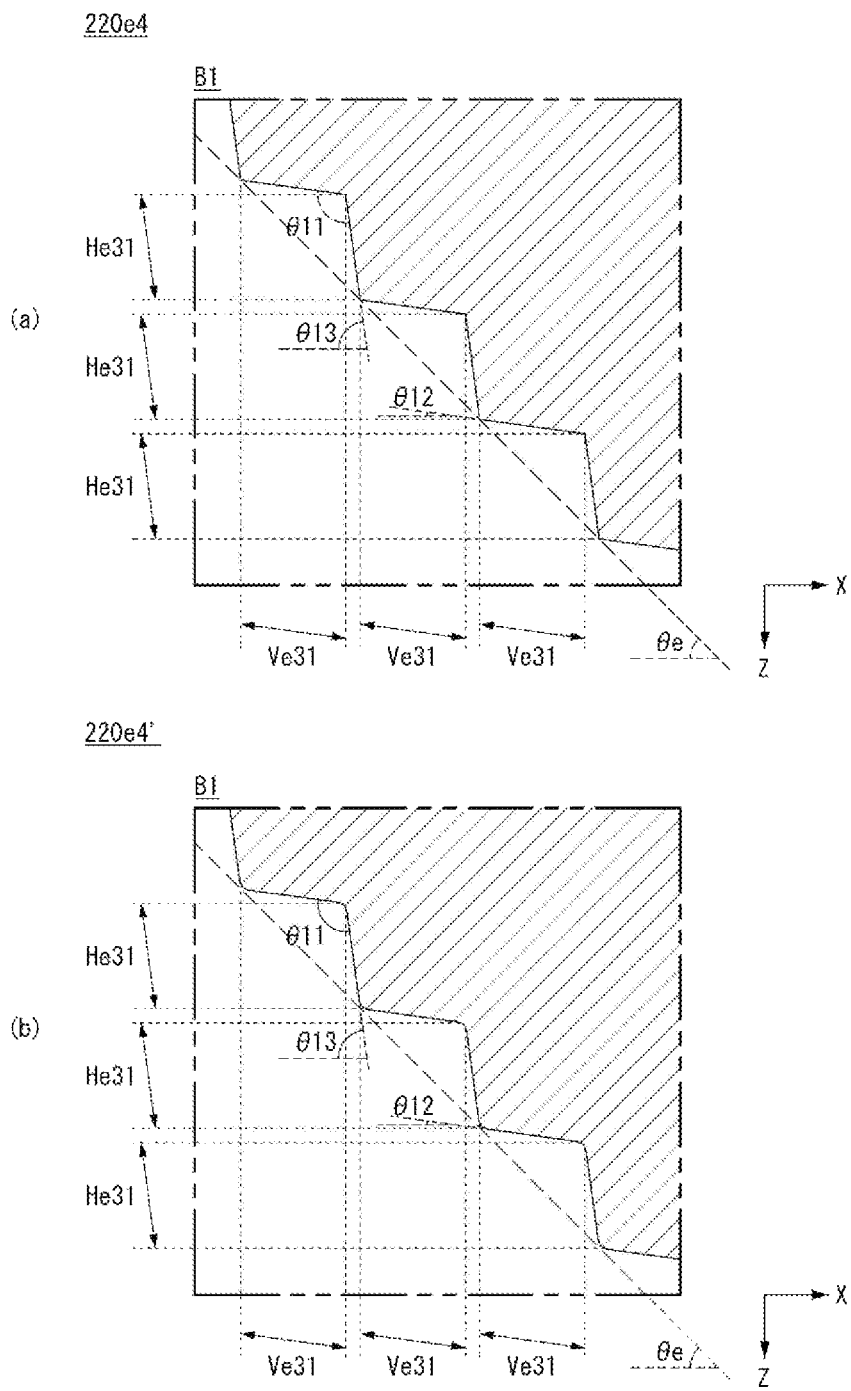

[FIG. 30]
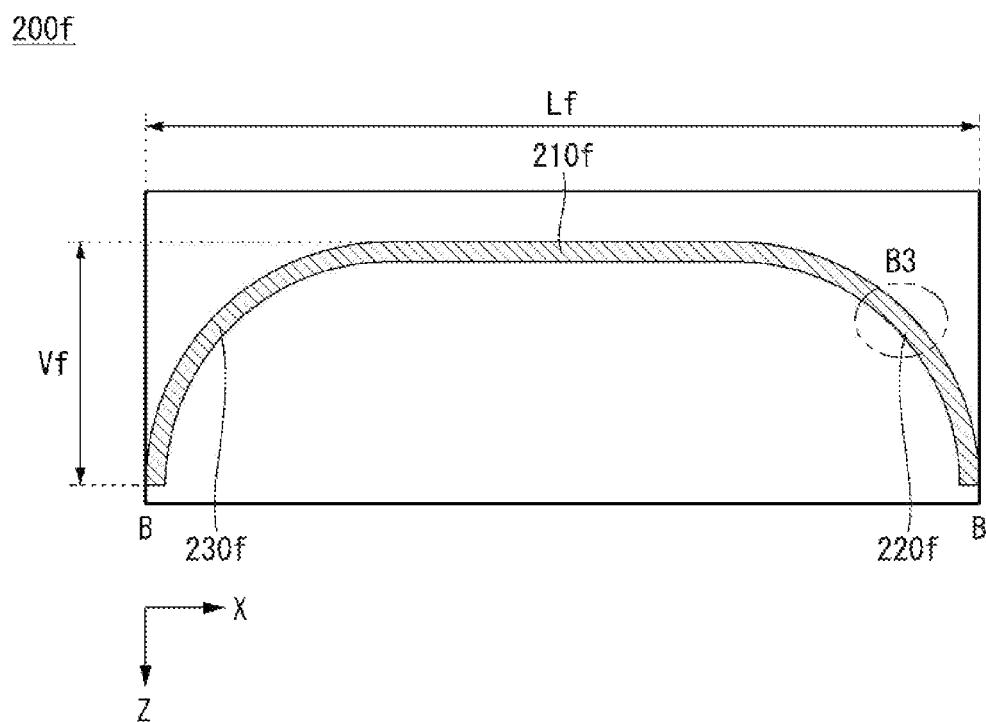

[FIG. 31]
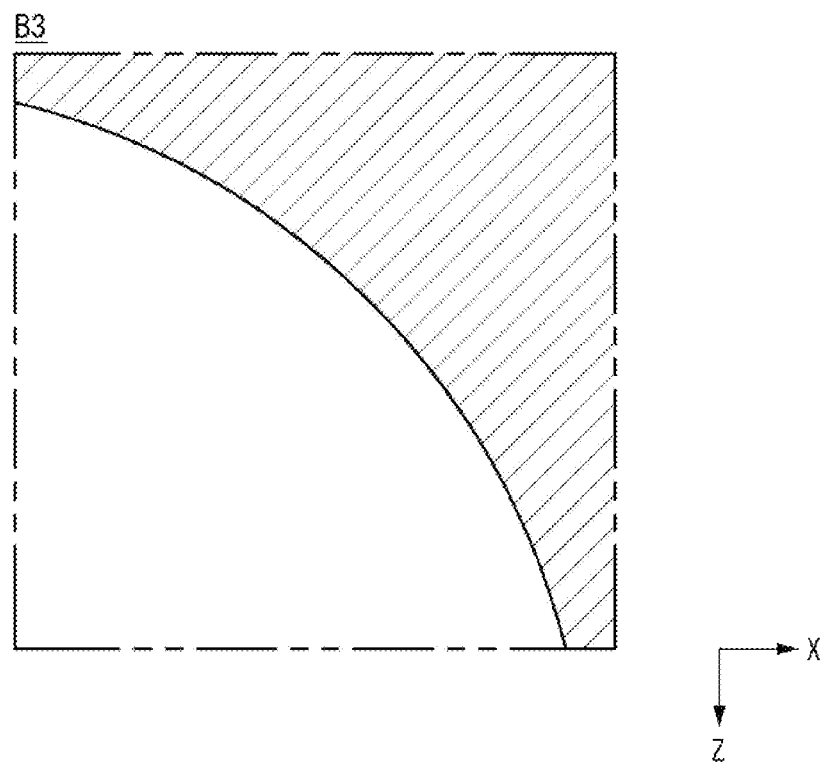

[FIG. 32]
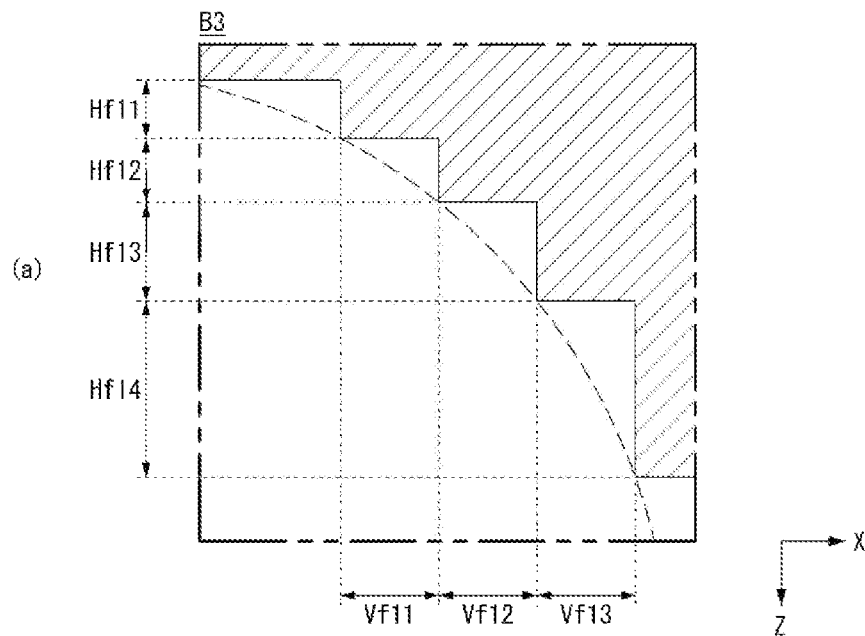
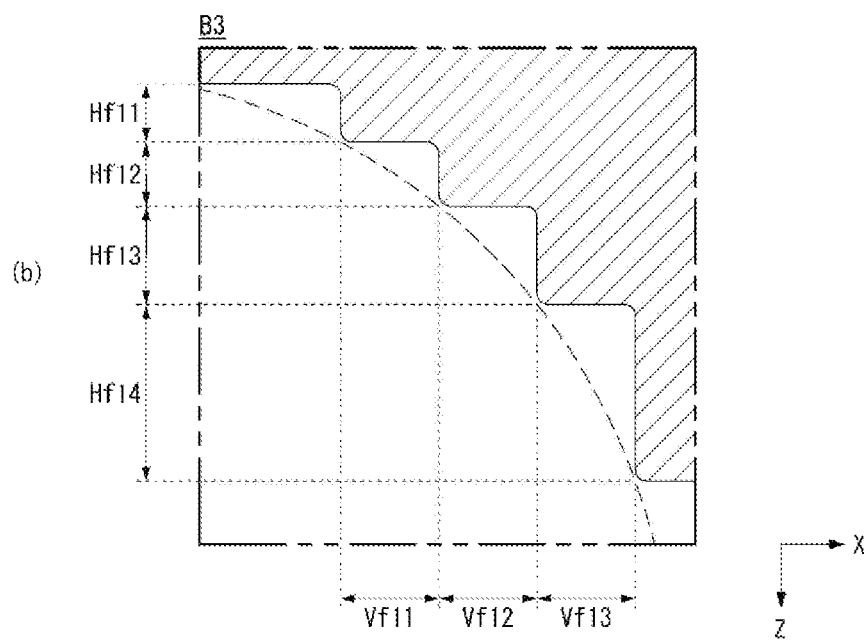

【FIG. 33】
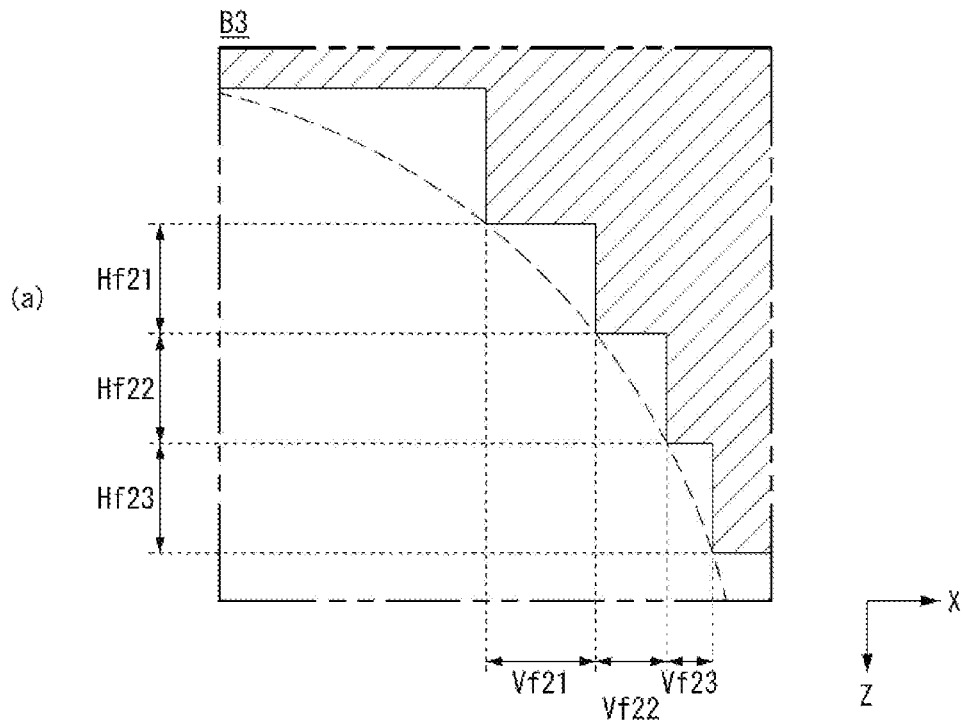
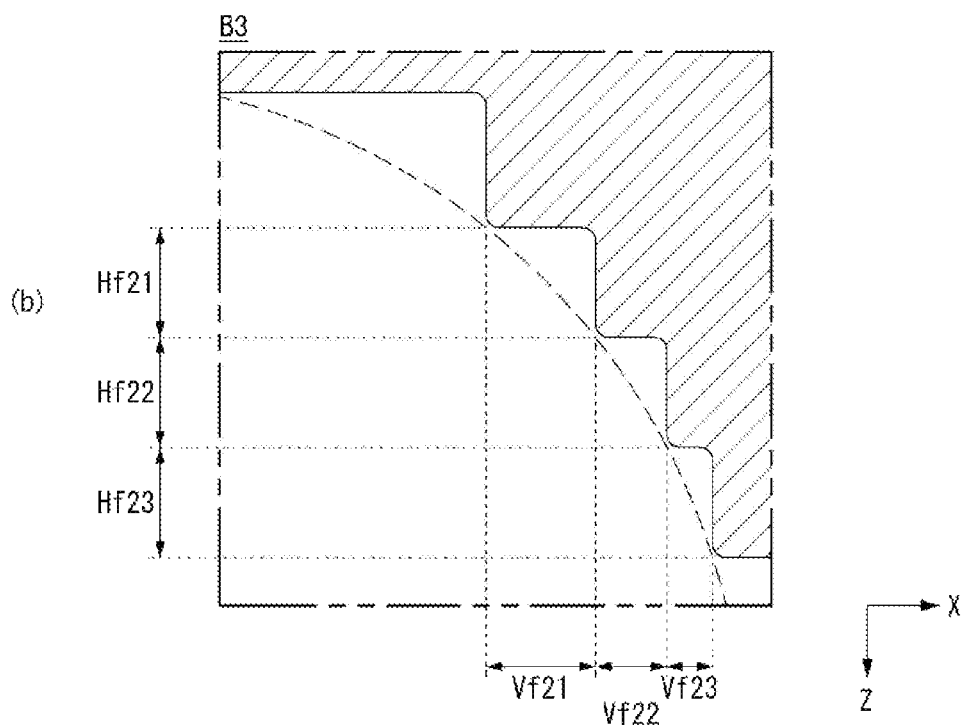

【FIG. 34】
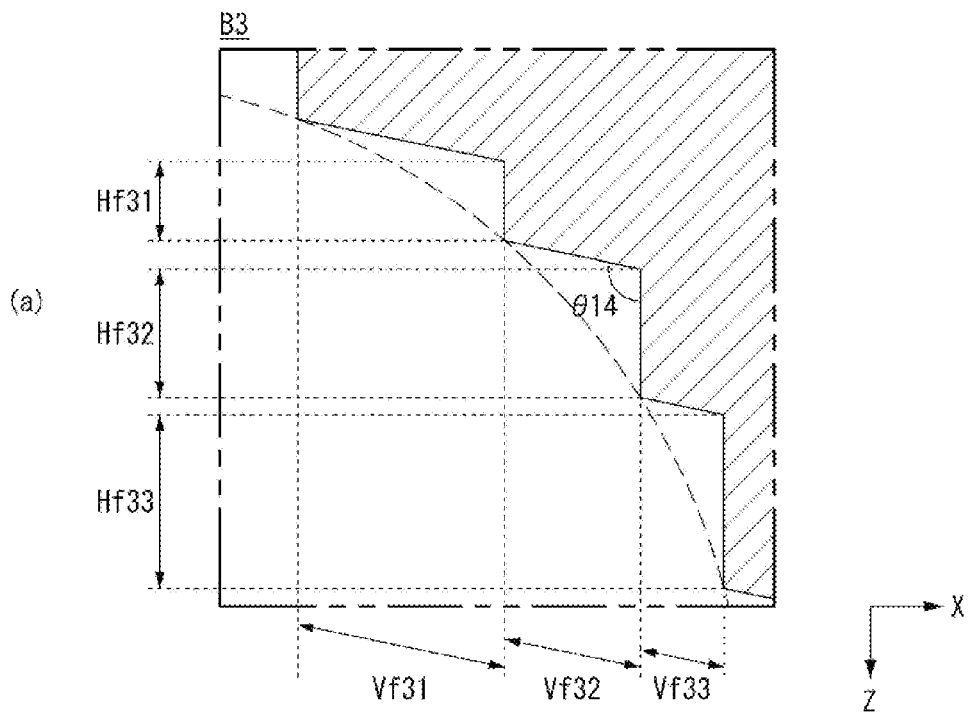
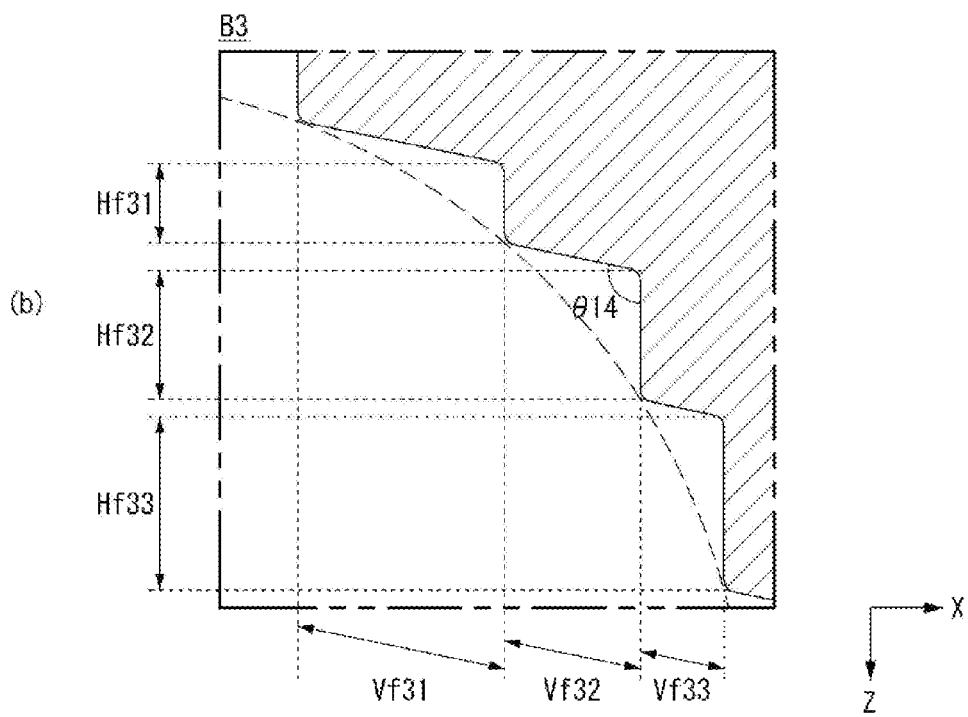

【FIG. 35】
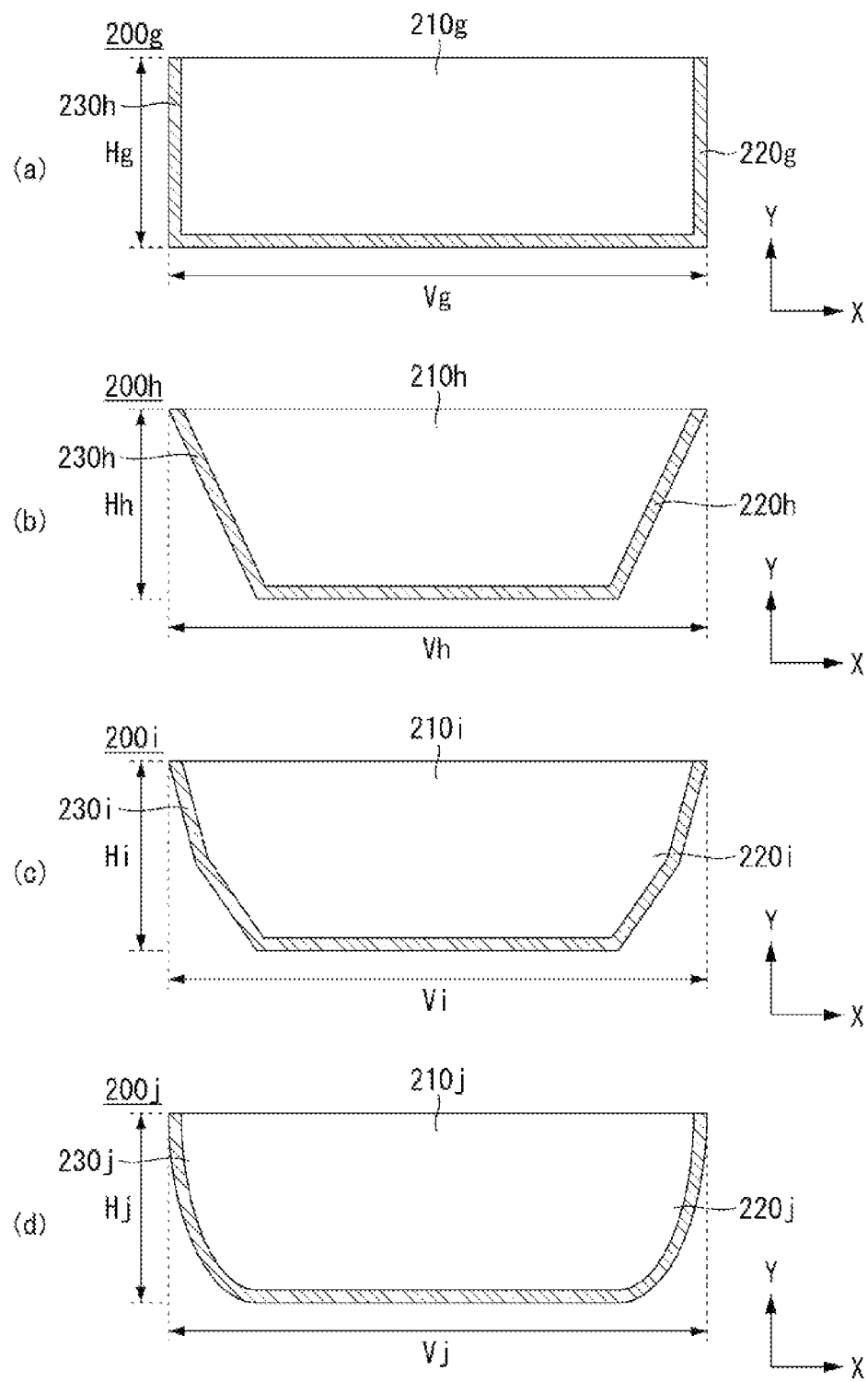

[FIG. 36]
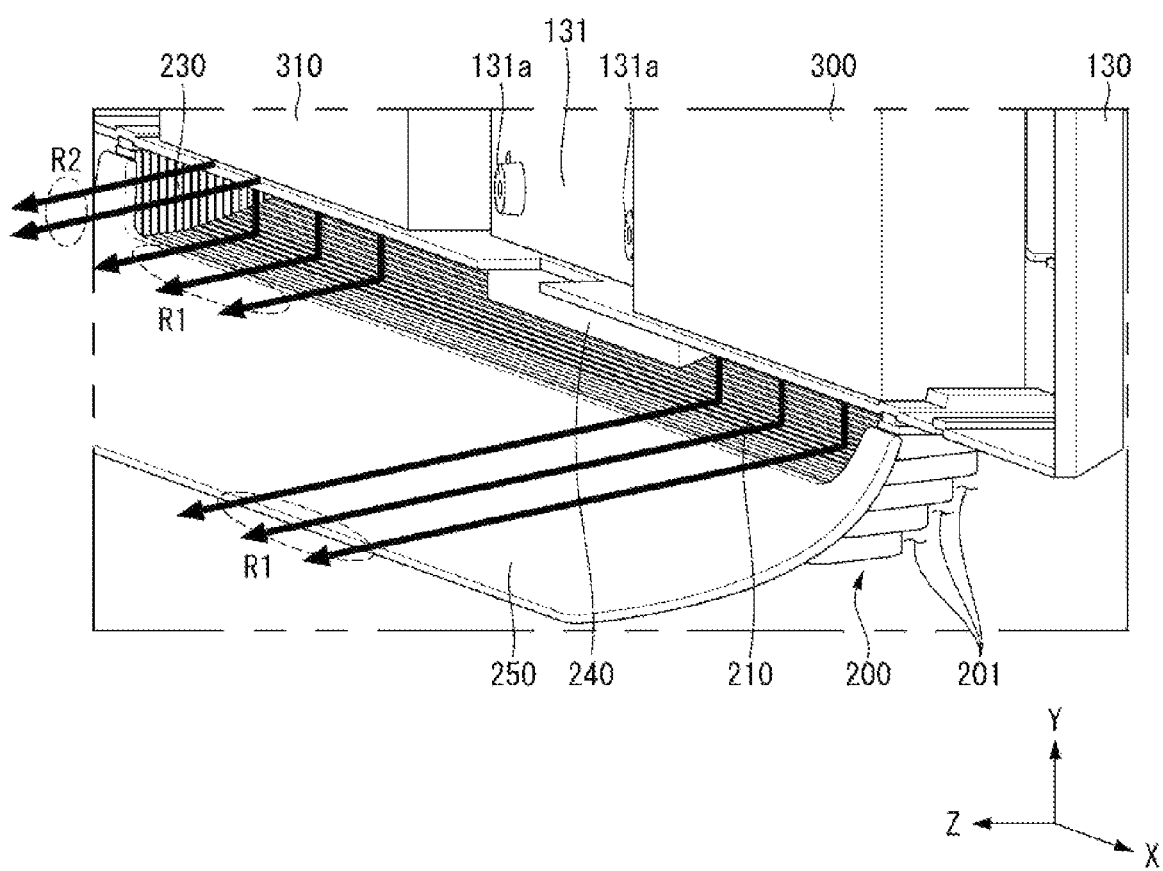

【FIG. 37】
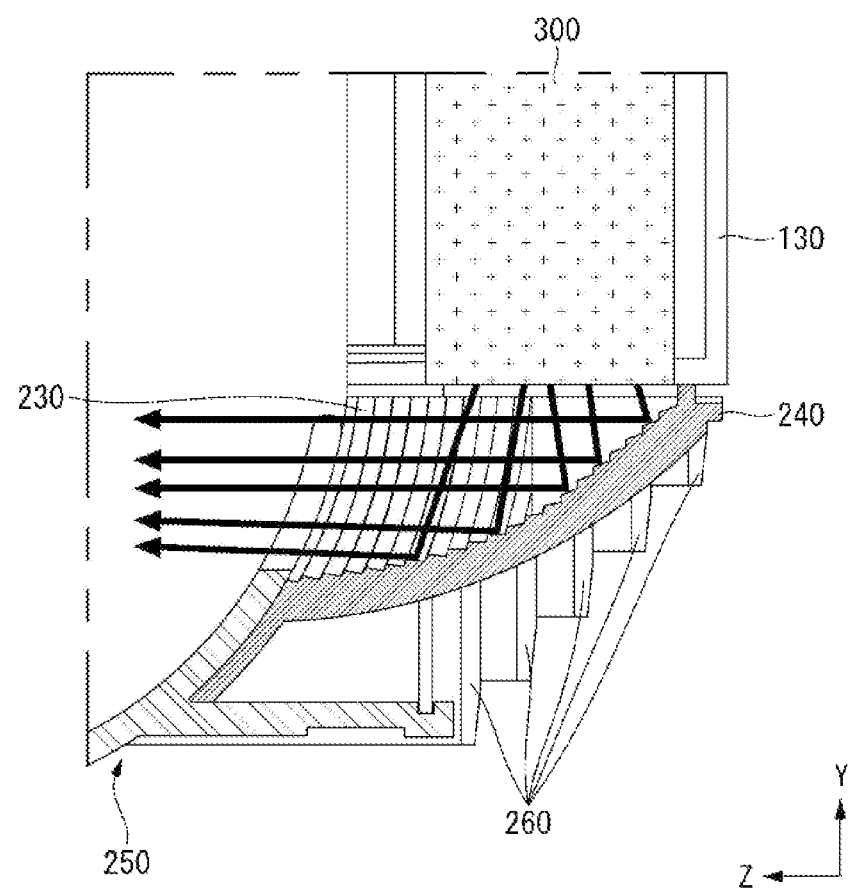

[FIG. 38]
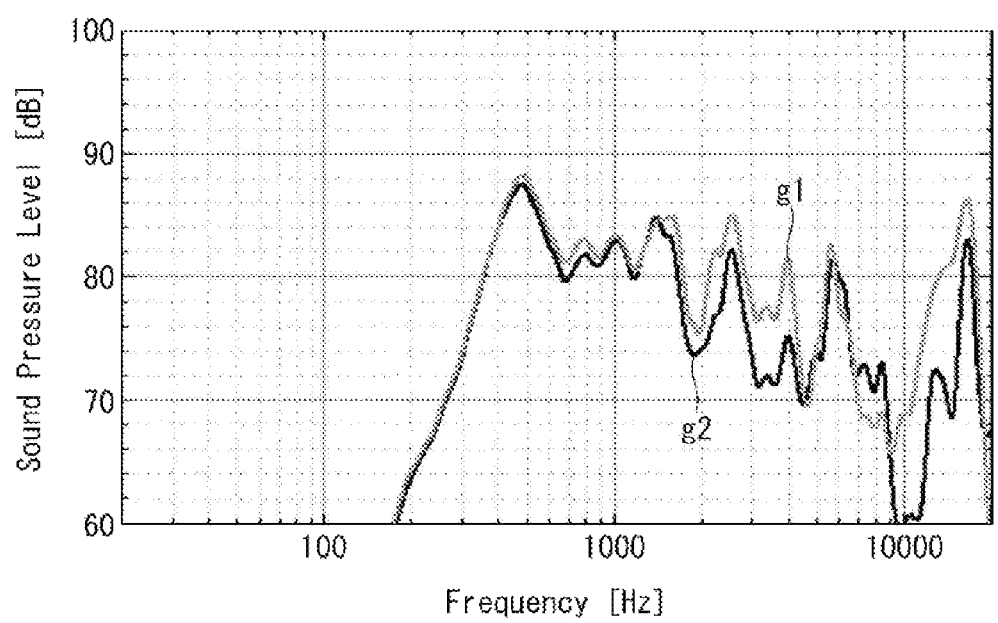

[FIG. 39]
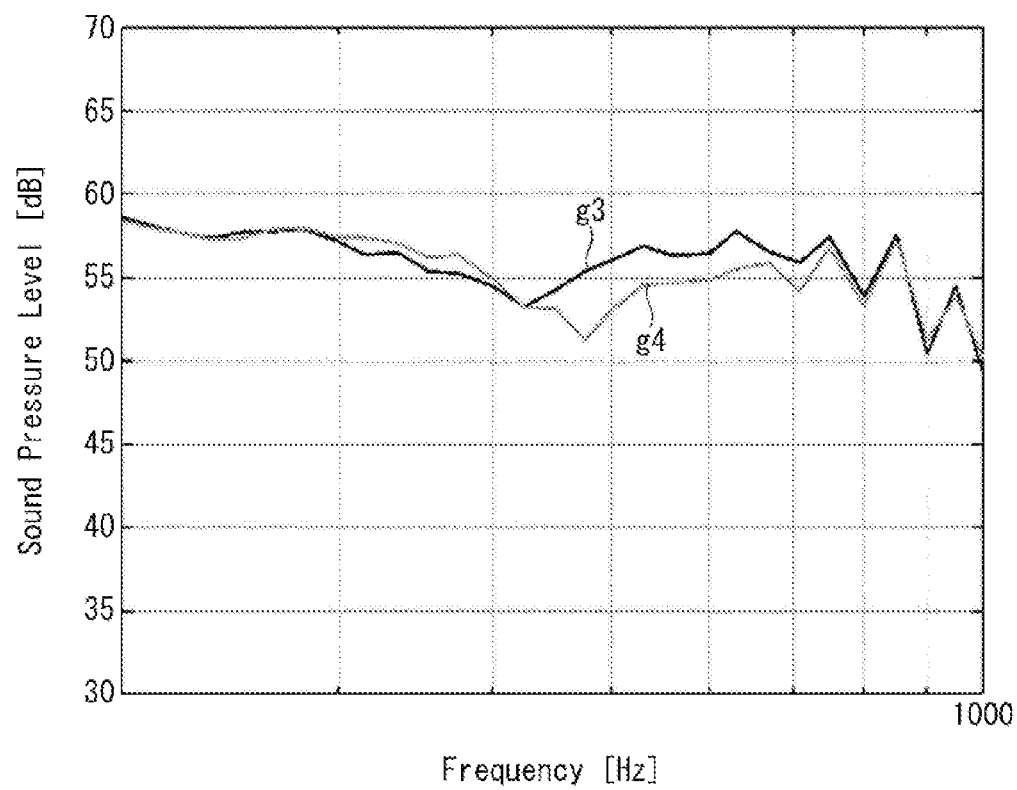

DISPLAY DEVICE

CROSS-REFERENCE TO RELATED APPLICATIONS

This application is the National Stage filing under 35 U.S.C. 371 of International Application No. PCT/KR2018/006226, filed on May 31, 2018, which claims the benefit of earlier filing date and right of priority to Korean Application No. 10-2018-0012358, filed on Jan. 31, 2018, the contents of which are all incorporated by reference herein in their entirety.

TECHNICAL FIELD

The present disclosure relates to a display device.

BACKGROUND ART

With the development of the information society, various demands for display devices are increasing. Various display devices, such as a liquid crystal display (LCD), a plasma display panel (PDP), an electroluminescent display (ELD), a vacuum fluorescent display (VFD), and an organic light emitting diode (OLED) display have been recently studied and used in response to the various demands for the display devices.

A sound system or an image control system that may be included in the display device recently tends to be small-sized and slim, and research has been actively conducted accordingly.

DISCLOSURE

Technical Problem

An object of the present disclosure is to address the above-described and other problems.

Another object of the present disclosure is to reflect forward sound of a speaker toward a lower part of a display device.

Another object of the present disclosure is to minimize a height of a reflective plate reflecting sound of a speaker.

Another object of the present disclosure is to prevent a resonance from occurring in a reflective plate.

Technical Solution

To achieve the above-described and other objects, in one aspect of the present disclosure, there is provided a display device comprising a display panel having a lower side; a speaker positioned in a rear of the display panel and adjacent to the lower side of the display panel, the speaker configured to provide a sound to a downward of the display panel; and a reflective plate covering the lower side and extending along the lower side, the reflective plate having an inner surface facing the speaker and including a step shape that protrudes from the inner surface and extends along the lower side, the reflective plate configured to reflect forward the sound provided by the speaker.

The display device may further comprise a cover coupled to a front surface of the reflective plate.

The step shape may include a first surface toward a front and a second surface that is connected to the first surface and faces the display panel.

The first surface and the second surface may form a right angle.

The first surface and the second surface may form an obtuse angle.

The first surface and the second surface may be roundly connected.

The step shape may include a plurality of step shapes, and the plurality of step shapes may be spaced apart along a thickness direction of the display panel.

Each step shape may include a third surface toward a front and a fourth surface that is connected to the third surface and faces the display panel. Heights of the third surfaces may be the same as each other.

Each step shape may include a fifth surface toward a front and a sixth surface that is connected to the fifth surface and faces the display panel. A height of the fifth surface may decrease as it goes to the front.

Each step shape may include a seventh surface toward a front and an eighth surface that is connected to the seventh surface and faces the display panel. The eighth surfaces may have the same depth in the thickness direction of the display device.

Each step shape may include a ninth surface toward a front and a tenth surface that is connected to the ninth surface and faces the display panel. The tenth surface may have an increasing depth in the thickness direction of the display device as it goes to the front.

The reflective plate may include a first part facing the speaker; and a second part that extends from a lower end of the first part and bends to a front of the first part.

The reflective plate may include a third part that extends from a lower end of the second part and bends to a front of the second part.

The reflective plate may include a first side plate that extends from one end of the first part and bends to the front of the first part; and a second side plate that extends from other end of the first part and bends to the front of the first part.

The reflective plate may include a second step shape that protrudes from the first side plate to an inside of the reflective plate and extends along a boundary of the first part and the first side plate.

Advantageous Effects

Effects of a display device according to the present disclosure are described as follows.

According to at least one aspect of the present disclosure, the present disclosure can reflect forward sound of a speaker toward a lower part of a display device.

According to at least one aspect of the present disclosure, the present disclosure can minimize a height of a reflective plate reflecting sound of a speaker.

According to at least one aspect of the present disclosure, the present disclosure can prevent a resonance from occurring in a reflective plate.

Additional scope of applicability of the present disclosure will become apparent from the detailed description given blow. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

DESCRIPTION OF DRAWINGS

FIG. 1 illustrates an example of a display device according to an embodiment of the present disclosure.

FIGS. 2 to 39 illustrate an example of a reflective plate according to an embodiment of the present disclosure.

MODE FOR INVENTION

Reference will now be made in detail to embodiments of the disclosure, examples of which are illustrated in the accompanying drawings. Wherever possible, the same reference numbers will be used throughout the drawings to refer to the same or like parts.

In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "connected to" or "coupled to" another component, this should be understood to mean that still other component(s) may exist between them, although any component may be directly connected to or directly coupled to another component. In contrast, when any component is described as "directly connected to" or "directly coupled to" another component, this should be understood to mean that no component exists between them.

A singular expression can include a plural expression as long as it does not have an apparently different meaning in context.

In the present disclosure, the terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the following description, embodiments of the present disclosure are described using an organic light emitting diode (OLED) display panel as an example of a display panel, but are not limited thereto. Other display panels may be used. For example, a plasma display panel (PDP), a field emission display (FED) panel, and a liquid crystal display (LCD) panel may be used.

The terms such as height, length, and width may be mixed and used for the convenience of explanation, and the respective terms do not have meanings or roles that are distinct from each other.

Referring to FIG. 1, a display panel 100 or a head portion may include a first long side LS1, a second long side LS2 opposite the first long side LS1, a first short side SS1 adjacent to the first long side LS1 and the second long side LS2, and a second short side SS2 opposite the first short side SS1.

In embodiments disclosed herein, the first short side SS1 may be referred to as a first side area, the second short side SS2 may be referred to as a second side area opposite the first side area, the first long side LS1 may be referred to as a third side area which is adjacent to the first side area and the second side area and is positioned between the first side area and the second side area, and the second long side LS2 may be referred to as a fourth side area which is adjacent to the first side area and the second side area, is positioned between the first side area and the second side area, and is opposite to the third side area.

Embodiments of the present disclosure illustrate and describe that lengths of the first and second long sides LS1 and LS2 are longer than lengths of the first and second short sides SS1 and SS2 for the convenience of explanation. However, the lengths of the first and second long sides LS1 and LS2 may be almost equal to the lengths of the first and second short sides SS1 and SS2.

Further, a first direction DR1 may be a direction parallel to the long sides LS1 and LS2 of the display panel 100, and a second direction DR2 may be a direction parallel to the short sides SS1 and SS2 of the display panel 100. A third direction DR3 may be a direction vertical to the first direction DR1 and/or the second direction DR2.

In addition, a side or a surface on which a display device displays an image may be referred to as a forward direction, a front side, or a front surface. When the display device displays an image, a side or a surface at which the image cannot be observed may be referred to as a backward or rearward direction, a back or rear side, or a back or rear surface. When the display device is viewed at the forward direction, the front side, or the front surface, the first long side LS1 may be referred to as an upward direction, an upper side, or an upper surface. In the same manner as the first long side LS1, the second long side LS2 may be referred to as a downward direction, a lower side, or a lower surface. Further, the first short side SS1 may be referred to as a right direction, a right side, or a right surface, and the second short side SS2 may be referred to as a left direction, a left side, or a left surface.

The first long side LS1, the second long side LS2, the first short side SS1, and the second short side SS2 may be referred to as edges of the display device. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1, a position where the first long side LS1 and the second short side SS2 meet each other may be referred to as a second corner C2, a position where the second short side SS2 and the second long side LS2 meet each other may be referred to as a third corner C3, and a position where the second long side LS2 and the first short side SS1 meet each other may be referred to as a fourth corner C4.

In embodiments disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

A reflective plate 200 may face the second long side LS2 or the fourth side area of the display panel 100. The reflective plate may be spaced apart from the second long side LS2 or the fourth side area of the display panel 100. The reflective plate 200 may be coupled to the rear surface of the display panel 100. The reflective plate 200 may be called a plate 200.

A stand 120 may support the display panel 100 or the reflective plate 200. The stand 120 may be coupled to the rear surface of the display panel 100 or the rear of the reflective plate 200.

Referring to FIG. 2, a speaker 110 may be positioned in the rear of the display panel 100. The speaker 110 may be adjacent to the second long side LS2 or the fourth side area of the display panel 100. The speaker 110 may be coupled to the rear surface of the display panel 100. The speaker 110 may provide sound in the downward direction. The reflective plate 200 may face the speaker 110. The reflective plate 200 may be coupled to the rear of the speaker 110. The reflective plate 200 may reflect the sound, that is provided in the downward direction by the speaker 110, to the front. The plurality of speakers 110 or the plurality of reflective plates 200 may be formed. The plurality of speakers 110 or the plurality of reflective plate 200 may be disposed along the second long side LS2 of the display panel 100.

Referring to FIG. 3, the reflective plate 200 may include side plates 220 and 230 that are spaced apart from each other, or a curved plate 210 connecting the side plates 220 and 230. The side plates 220 and 230 may be called plates 220 and 230. The curved plate 210 may be called a plate 210. The reflective plate 200 may be opened in a +Y-axis direction or a +Z-axis direction. The side plates 220 and 230 or the curved plate 210 may reflect the sound, that is provided in the downward direction by the speaker 110, to the front.

Referring to FIG. 4, a reflective plate 200a may have a height Ha in the Y-axis direction and have a depth Va in the Z-axis direction. The reflective plate 200a may be inclined to the Z-axis by an angle θa. The angle θa may be an acute angle.

Referring to FIG. 5, a plate 210a1 may have a smooth surface. The sound provided in the downward direction from the speaker 110 may be reflected from the smooth surface and may be emitted forward.

Referring to FIG. 6, a plate 210a2 may have a step shape. The step shape may extend along the X-axis direction or a longitudinal direction of the plate 210a2. Horizontal surfaces of the step shape may have a depth Va11. Vertical surfaces of the step shape may have a height Ha11. The horizontal surfaces and the vertical surfaces may form a right angle. The sound provided in the downward direction from the speaker 110 may be reflected from the horizontal surfaces or the vertical surfaces of the step shape and may be emitted forward. Horizontal surfaces and vertical surfaces of a plate 210a2' may be roundly connected.

Referring to FIG. 7, a plate 210a3 may have a step shape. The step shape may extend along the X-axis direction or a longitudinal direction of the plate 210a3. First surfaces Va2 of the step shape may have depths Va21, Va22 and Va23. The first surfaces may be inclined to the Z-axis by an angle θVa2. Vertical surfaces Ha2 of the step shape may have heights Ha21, Ha22 and Ha23. The second surfaces may be inclined to the Z-axis by an angle θHa2. The first surface Va2 and the second surface Ha2 may form an angle θ1. For example, the angle θ1 may be an obtuse angle. The sound provided in the downward direction from the speaker 110 may be reflected from the first surface Va2 or the second surface Ha2 of the step shape and may be emitted forward. The first surface Va2' and the second surface Ha2' of the plate 210a3' may be roundly connected.

Referring to FIG. 8, a plate 210a4 may have a step shape. The step shape may extend along the X-axis direction or a longitudinal direction of the plate 210a4. Horizontal surfaces of the step shape may have depths Va31, Va32 and Va33. The depth Va31 may be greater than the depth Va32. The depth Va32 may be greater than the depth Va33. Vertical surfaces of the step shape may have heights Ha31, Ha32 and Ha33. The height Ha31 may be greater than the height Ha32. The height Ha32 may be greater than the height Ha33. The horizontal surfaces and the vertical surfaces may form a right angle. The sound provided in the downward direction from the speaker 110 may be reflected from the horizontal surfaces or the vertical surfaces of the step shape and may be emitted forward. Horizontal surfaces and vertical surfaces of a plate 210a4' may be roundly connected.

Referring to FIG. 9, a reflective plate 200b may have a height Hb in the Y-axis direction and have a depth Vb in the Z-axis direction. A curved plate 210b may include a first part 210ba and a second part 210bb. The first part 210ba may be inclined to the Z-axis by an angle θb1. The second part 210bb may be inclined to the Z-axis by an angle θb2. The angle θb1 may be greater than the angle θb2. The angles θb1 and θb2 may be an acute angle.

Referring to FIG. 10, a curved plate 210b1 may have a smooth surface. Alternatively, a first part 210b11 and a second part 210b12 may have a smooth surface. The sound provided in the downward direction from the speaker 110 may be reflected from the smooth surface and may be emitted forward.

Referring to FIG. 11, a curved plate 210b2 may have a step shape. The step shape may extend along the X-axis direction or a longitudinal direction of the curved plate 210b2. Horizontal surfaces of a step shape of a first part 210b21 may have a depth Vb11. Vertical surfaces of the step shape of the first part 210b21 may have a height Hb11. The horizontal surfaces and the vertical surfaces may form a right angle. Horizontal surfaces of a step shape of a second part 210b22 may have a depth Vb12. Vertical surfaces of the step shape of the second part 210b22 may have a height Hb12. The horizontal surfaces and the vertical surfaces may form a right angle. The sound provided in the downward direction from the speaker 110 may be reflected from the horizontal surfaces or the vertical surfaces of the step shape and may be emitted forward. Horizontal surfaces and vertical surfaces of a plate 210b2' may be roundly connected.

Referring to FIG. 12, a curved plate 210b3 may have a step shape. The step shape may extend along the X-axis direction or a longitudinal direction of the curved plate 210b3. Horizontal surfaces of a step shape of a first part 210b31 may have depths Vb21, Vb22 and Vb23. The depth Vb21 may be greater than the depth Vb22. The depth Vb22 may be greater than the depth Vb23. Vertical surfaces of the step shape of the first part 210b31 may have heights Hb21 and Hb22. The height Hb21 may be greater than the height Hb22. The horizontal surfaces and the vertical surfaces of the first part 210b31 may form a right angle. Horizontal surfaces of a step shape of a second part 210b32 may have depths Vb24 and Vb25. The depth Vb24 may be greater than the depth Vb25. Vertical surfaces of the step shape of the second part 210b32 may have heights Hb23 and Hb24. The height Hb23 may be greater than the height Hb24. The horizontal surfaces and the vertical surfaces of the second part 210b32 may form a right angle. The sound provided in the downward direction from the speaker 110 may be reflected from the horizontal surfaces or the vertical surfaces of the step shape and may be emitted forward. Horizontal surfaces and vertical surfaces of a plate 210b3' may be roundly connected.

Referring to FIG. 13, a reflective plate 200c may have a height Hc in the Y-axis direction and have a depth Vc in the Z-axis direction. A curved plate 210c may include a first part 210ca, a second part 210cb, and a third part 210cc. The first part 210ca may be inclined to the Z-axis by an angle θc1. The second part 210cb may be inclined to the Z-axis by an angle θc2. The third part 210cc may be inclined to the Z-axis by an angle θc3. The angle θc1 may be greater than the angle θc2. The angle θc2 may be greater than the angle θc3. The angles θc1, θc2 and θc3 may be an acute angle.

Referring to FIG. 14, a curved plate 210c1 may have a smooth surface. Alternatively, a first part 210c11 and a second part 210c12 may have a smooth surface. The sound provided in the downward direction from the speaker 110 may be reflected from the smooth surface and may be emitted forward.

Referring to FIG. 15, a curved plate 210c2 may have a step shape. The step shape may extend along the X-axis direction or a longitudinal direction of the curved plate 210c2. Horizontal surfaces of a step shape of a first part 210c21 may have a depth Vc11a. Vertical surfaces of the step shape of the first part 210c21 may have a height Hc11a. The horizontal surfaces and the vertical surfaces may form a right angle. Horizontal surfaces of a step shape of a second part 210c22 may have a depth Vc12a. Vertical surfaces of the step shape of the second part 210c22 may have a height Hc12a. The horizontal surfaces and the vertical surfaces may form a right angle. The sound provided in the downward direction from the speaker 110 may be reflected from the horizontal surfaces or the vertical surfaces of the step shape and may be emitted forward. Horizontal surfaces and vertical surfaces of a plate 210c2' may be roundly connected.

Referring to FIG. 16, a curved plate 210c3 may have a step shape. The step shape may extend along the X-axis direction or a longitudinal direction of the curved plate 210c3. Horizontal surfaces of a step shape of a first part 210c31 may have depths Vc21a, Vc22a and Vc23a. The depth Vc21a may be greater than the depth Vc22a. The depth Vc22a may be greater than the depth Vc23a. Vertical surfaces of the step shape of the first part 210c31 may have heights Hc21a and Hc22a. The height Hc21a may be greater than the height Hc22a. The horizontal surfaces and the vertical surfaces of the first part 210c31 may form a right angle. Horizontal surfaces of a step shape of a second part 210c32 may have depths Vc24a and Vc25a. The depth Vc24a may be greater than the depth Vc25a. Vertical surfaces of the step shape of the second part 210c32 may have heights Hc23a and Hc24a. The height Hc23a may be greater than the height Hc24a. The horizontal surfaces and the vertical surfaces of the second part 210c32 may form a right angle. The sound provided in the downward direction from the speaker 110 may be reflected from the horizontal surfaces or the vertical surfaces of the step shape and may be emitted forward. Horizontal surfaces and vertical surfaces of a plate 210c3' may be roundly connected.

Referring to FIG. 17, a curved plate 210c4 may have a smooth surface. Alternatively, a third part 210c41 and a fourth part 210c42 may have a smooth surface. The sound provided in the downward direction from the speaker 110 may be reflected from the smooth surface and may be emitted forward.

Referring to FIG. 18, a curved plate 210c5 may have a step shape. The step shape may extend along the X-axis direction or a longitudinal direction of the curved plate 210c5. Horizontal surfaces of a step shape of a third part 210c51 may have a depth Vc11b. Vertical surfaces of the step shape of the third part 210c51 may have a height Hc11b. The horizontal surfaces and the vertical surfaces may form a right angle. Horizontal surfaces of a step shape of a fourth part 210c52 may have a depth Vc12b. Vertical surfaces of the step shape of the fourth part 210c52 may have a height Hc12b. The horizontal surfaces and the vertical surfaces may form a right angle. The sound provided in the downward direction from the speaker 110 may be reflected from the horizontal surfaces or the vertical surfaces of the step shape and may be emitted forward. Horizontal surfaces and vertical surfaces of a plate 210c5' may be roundly connected.

Referring to FIG. 19, a curved plate 210c6 may have a step shape. The step shape may extend along the X-axis direction or a longitudinal direction of the curved plate 210c6. Horizontal surfaces of a step shape of a third part 210c61 may have depths Vc21b, Vc22b and Vc23b. The depth Vc21b may be greater than the depth Vc22b. The depth Vc22b may be greater than the depth Vc23b. Vertical surfaces of the step shape of the third part 210c61 may have heights Hc21b and Hc22b. The height Hc21b may be greater than the height Hc22b. The horizontal surfaces and the vertical surfaces of the third part 210c61 may form a right angle. Horizontal surfaces of a step shape of a fourth part 210c62 may have depths Vc24b and Vc25b. The depth Vc24b may be greater than the depth Vc25b. Vertical surfaces of the step shape of the fourth part 210c62 may have heights Hc23b and Hc24b. The height Hc23b may be greater than the height Hc24b. The horizontal surfaces and the vertical surfaces of the fourth part 210c62 may form a right angle. The sound provided in the downward direction from the speaker 110 may be reflected from the horizontal surfaces or the vertical surfaces of the step shape and may be emitted forward. Horizontal surfaces and vertical surfaces of a plate 210c6' may be roundly connected.

Referring to FIG. 20, a reflective plate 200d may have a height Hd in the Y-axis direction and have a depth Vd in the Z-axis direction. A curved plate 210d may have a rounded curved shape.

Referring to FIG. 21, a curved plate 210d1 may have a smooth surface. The sound provided from the speaker 110 may be reflected from the smooth surface and may be emitted forward.

Referring to FIG. 22, a curved plate 210d2 may have a step shape. The step shape may extend along the X-axis direction or a longitudinal direction of the curved plate 210d2. Horizontal surfaces of the step shape may have depths Vd11, Vd12, Vd13 and Vd14. The depth Vd14 may be greater than the depth Vd13. The depth Vd13 may be greater than the depth Vd12. The depth Vd12 may be greater than the depth Vd11. Vertical surfaces of the step shape may have a height Hd11. The horizontal surfaces and the vertical surfaces may form a right angle. The sound provided from the speaker 110 may be reflected from the horizontal surfaces or the vertical surfaces of the step shape and may be emitted forward. Horizontal surfaces and vertical surfaces of a plate 210d2' may be roundly connected.

Referring to FIG. 23, a curved plate 210d3 may have a step shape. The step shape may extend along the X-axis direction or a longitudinal direction of the curved plate 210d3. Horizontal surfaces of the step shape may have a depth Vd21. Vertical surfaces of the step shape may have heights Hd21, Hd22 and Hd23. The height Hd21 may be greater than the height Hd22. The height Hd22 may be greater than the height Hd23. The horizontal surfaces and the vertical surfaces may form a right angle. The sound provided from the speaker 110 may be reflected from the horizontal surfaces or the vertical surfaces of the step shape and may be emitted forward. Horizontal surfaces and vertical surfaces of a plate 210d3' may be roundly connected.

Referring to FIG. 24, a curved plate 210d4 may have a step shape. The step shape may extend along the X-axis direction or a longitudinal direction of the curved plate

210d4. Horizontal surfaces of the step shape may have depths Vd31, Vd32 and Vd33. The depth Vd33 may be greater than the depth Vd32. The depth Vd32 may be greater than the depth Vd31. Inclined surfaces of the step shape may be inclined to the horizontal surface by an angle θ10. The angle θ10 may be an obtuse angle. The inclined surfaces may have lengths Hd31, Hd32 and Hd33 in an inclined direction. The length Hd31 may be greater than the length Hd32. The length Hd32 may be greater than the length Hd33. The sound provided from the speaker 110 may be reflected from the horizontal surfaces or the inclined surfaces of the step shape and may be emitted forward. Horizontal surfaces and inclined surfaces of a plate 210d4' may be roundly connected.

According to the above-described embodiments, the reflective plates 200, 200a, 200b, 200c and 200d may be curved or include the step shape. Hence, the embodiments can maintain a function of reflecting the sound of the speaker 110 while minimizing the Y-axis direction height of the reflective plates 200, 200a, 200b, 200c and 200d. Further, the embodiments can prevent the sound emitted from the speaker 110 from being resonated inside the reflective plates 200, 200a, 200b, 200c and 200d. Thus, the embodiments can minimize an energy loss of the sound. The sound emitted from the speaker 110 may be diffuse-reflected from the reflective plates 200, 200a, 200b, 200c and 200d, and the reflected sound may be uniformly radiated to the front of the display device.

Referring to FIG. 25, a reflective plate 200e may have a width He in the X-axis direction and have a depth Ve in the Z-axis direction. A side plate 220e may be inclined to the X-axis by an angle θe. The angle θe may be an acute angle. The side plates 220e and 230e may be symmetrical to a curved plate 210e.

Referring to FIG. 26, a side plate 220e1 may have a smooth surface. The sound provided from the speaker 110 may be reflected from the smooth surface and may be emitted forward.

Referring to FIG. 27, a side plate 220e2 may have a step shape. The step shape may extend along the Y-axis direction or a height direction of the side plate 220e2. First vertical surfaces of the step shape may have a width Ve11. Second vertical surfaces of the step shape may have a depth He11. The first vertical surfaces and the second vertical surfaces may form a right angle. The sound provided from the speaker 110 may be reflected from the first vertical surfaces or the second vertical surfaces of the step shape and may be emitted forward. First vertical surfaces and second vertical surfaces of a side plate 220e2' may be roundly connected.

Referring to FIG. 28, a side plate 220e3 may have a step shape. The step shape may extend along the Y-axis direction or a height direction of the side plate 220e3. Third vertical surfaces of the step shape may have widths Ve21, Ve22 and Ve23. The width Ve21 may be greater than the width Ve22. The width Ve22 may be greater than the width Ve23. Fourth vertical surfaces of the step shape may have depths He21, He22 and He23. The depth He21 may be greater than the depth He22. The depth He22 may be greater than the depth He23. Fourth vertical surfaces of the step shape may have depths He21, He22, He23. The depth He21 may be greater than the depth He22. The depth He22 may be greater than the depth He23. The third vertical surfaces and the fourth vertical surfaces may form a right angle. The sound provided from the speaker 110 may be reflected from the third vertical surfaces or the fourth vertical surfaces of the step shape and may be emitted forward. Third vertical surfaces and fourth vertical surfaces of a side plate 220e3' may be roundly connected.

Referring to FIG. 29, a side plate 220e4 may have a step shape. The step shape may extend along the Y-axis direction or a height direction of the side plate 220e4. Fifth vertical surfaces of the step shape may be inclined to the X-axis by an angle θ12. The fifth vertical surfaces of the step shape may have a length Ve31. Sixth vertical surfaces of the step shape may be inclined to the X-axis by an angle θ13. The sixth vertical surfaces of the step shape may have a length He31. The angle θ13 may be greater than the angle θ12. The fifth vertical surfaces and the sixth vertical surfaces may form an angle θ11. For example, the angle θ11 may be an obtuse angle. The sound provided from the speaker 110 may be reflected from the fifth vertical surfaces or the sixth vertical surfaces of the step shape and may be emitted forward. Fifth vertical surfaces and sixth vertical surfaces of a side plate 220e4' may be roundly connected.

Referring to FIG. 30, a reflective plate 200f may have a width Lf in the X-axis direction and have a depth Vf in the Z-axis direction. Side plates 220f and 230f may have a rounded curved shape. The side plates 220f and 230f may be symmetrical to a curved plate 210f.

Referring to FIG. 31, a side plate 220fa may have a smooth surface. The sound provided from the speaker 110 may be reflected from the smooth surface and may be emitted forward.

Referring to FIG. 32, a side plate 220f1 may have a step shape. The step shape may extend along the Z-axis direction or a height direction of the side plate 220f1. Seventh vertical surfaces of the step shape may have widths Vf11, Vf12 and Vf13. The widths Vf11, Vf12 and Vf13 may be the same as each other. Eighth vertical surfaces of the step shape may have depths Hf11, Hf12, Hf13 and Hf14. The depth Hf14 may be greater than the depth Hf13. The depth Hf13 may be greater than the depth Hf12. The depth Hf12 may be greater than the depth Hf11. The seventh vertical surfaces and the eighth vertical surfaces may form a right angle. The sound provided from the speaker 110 may be reflected from the seventh vertical surfaces or the eighth vertical surfaces of the step shape and may be emitted forward. Seventh vertical surfaces and eighth vertical surfaces of a side plate 220g1' may be roundly connected.

Referring to FIG. 33, a side plate 220f2 may have a step shape. The step shape may extend along the Z-axis direction or a height direction of the side plate 220g2. Ninth vertical surfaces of the step shape may have widths Vf21, Vf22 and Vf23. The width Vf21 may be greater than the width Vf22. The width Vf22 may be greater than the width Vf23. Tenth vertical surfaces of the step shape may have depths Hf21, Hf22 and Hf23. The depths Hf21, Hf22 and Hf23 may be the same as each other. The ninth vertical surfaces and the tenth vertical surfaces may form a right angle. The sound provided from the speaker 110 may be reflected from the ninth vertical surfaces or the tenth vertical surfaces of the step shape and may be emitted forward. Ninth vertical surfaces and tenth vertical surfaces of a side plate 220f2' may be roundly connected.

Referring to FIG. 34, a side plate 220f3 may have a step shape. The step shape may extend along the Z-axis direction or a height direction of the side plate 220f3. Eleventh vertical surfaces of the step shape may have lengths Vf31, Vf32 and Vf33. The lengths Vf31, Vf32 and Vf33 may be the same as each other. The length Vf31 may be greater than the length Vf32. The length Vf32 may be greater than the length Vf33. Twelfth vertical surfaces of the step shape may be perpendicular to the X-axis. The twelfth vertical surfaces of the step shape may have depths Hf31, Hf32 and Hf33. The depth Hf33 may be greater than the depth Hf32. The depth Hf32 may be greater than the depth Hf31. The eleventh vertical surfaces and the twelfth vertical surfaces may form an angle θ14. For example, the angle θ14 may be an obtuse angle. The sound provided from the speaker 110 may be reflected from the eleventh vertical surfaces or the twelfth vertical surfaces of the step shape and may be emitted forward. Eleventh vertical surfaces and twelfth vertical surfaces of a side plate 220f3' may be roundly connected.

According to the above-described embodiments, the reflective plates 200, 200e and 200g may be curved or include the step shape. Hence, the embodiments can maintain a function of reflecting the sound of the speaker 110 while minimizing the Y-axis direction height of the reflective plates 200, 200e and 200g. Further, the embodiments can prevent the sound emitted from the speaker 110 from being resonated inside the reflective plates 200, 200e and 200g. Thus, the embodiments can minimize an energy loss of the sound. The sound emitted from the speaker 110 may be diffuse-reflected from the reflective plates 200, 200e and 200g, and the reflected sound may be uniformly radiated to the front of the display device.

Referring to FIG. 35, a front surface of a reflective plate 200g may have a rectangular shape. Side plates 230h and 220g and a curved plate 210g may form a rectangle. The reflective plate 200g may have a width Vg and a height Hg. Alternatively, a front surface of a reflective plate 200f may have a trapezoid shape. Side plates 230h and 220h and a curved plate 210h may form a trapezoid. The reflective plate 200h may have a width Vh and a height Hh. Alternatively, a front surface of a reflective plate 200i may have a polygon shape. Side plates 230i and 220i and a curved plate 210i may form a polygon. The reflective plate 200i may have a width Vj and a height Hj. Alternatively, left and right sides of a reflective plate 200j may have a curved shape. Side plates 230j and 220j and a curved plate 210jk may form an appearance of the reflective plate 200j. The reflective plate 200j may have a width Vj and a height Hj.

Referring to FIGS. 36 and 37, a back cover 130 may be positioned in the rear of a display panel 100 or a display module. The back cover 130 may be coupled to a rear surface of the display panel 100 or a rear surface of the display module. Speakers 300 and 310 may be fastened to the back cover 130. The speakers 300 and 310 may emit sound in the downward direction. Alternatively, the speakers 300 and 310 may emit sound in the −Y-axis direction. The sound emitted from the speakers 300 and 310 may be reflected forward or in the +Z-axis direction from the reflective plate 200. The sound emitted from the speakers 300 and 310 may be reflected from the plate 210 (as indicated by R1), or may be reflected from the side plate 230 (as indicated by R2).

The back cover 130 may be called a frame 130 or a cover 130. The back cover 130 may include a coupling portion 131, and the coupling portion 131 may include coupling protrusions 131a. The back cover 130 may be fastened to the display panel 100 or the display module through the coupling protrusions 131a.

The reflective plate 200 may include a coupling portion 240. The coupling portion 240 may be fastened to the coupling portion 131 of the back cover 130. The reflective plate 200 may include a rigid portion 260. The rigid portion 260 may extend in the downward direction or the Y-axis direction of the plate 210. The rigid portion 260 may increase the rigidity of the reflective plate 200. The plurality of rigid portions 260 may be formed and may be spaced apart in the X-axis direction.

A cover 250 may be coupled to the front surface of the reflective plate 200. The reflective plate 200 may include a stepped portion 201. The stepped portion 201 may be formed on the rear surface of the reflective plate 200. The stepped portion 201 may reduce the weight of the reflective plate 200.

Referring to FIG. 38, a graph may show the measurement of a sound pressure of sound emitted to the front of the display device through the reflective plate 200. A graph g1 may be a graph for the reflective plates 200b, 200c and 200d. A graph g2 may be a graph for the reflective plate 200a. A sound pressure loss in the graph g1 may be less than that in the graph g2.

Referring to FIG. 39, a graph may show the measurement of a sound pressure of sound emitted to the front of the display device through the reflective plate 200. A graph g3 may be a graph for step-shaped reflective plates 210a2, 210a2', 210a3, 210a3', 210a4, 210a4', 210b2, 210b2', 210b3, 210b3', 210c2, 210c2', 210c3, 210c3', 210c5, 210c5', 210c6, 210c6', 210d2, 210d2', 210d3, 210d3', 210d4, 210d4', 220e2, 220e2', 220e3, 220e3', 220e4, 220e4', 220g1, 220g1', 220g2, 220g2', 220g3, and 220g3'. A graph g4 may be a graph for reflective plates not having a step shape 210a1, 210b1, 210c1, 210c4, 210d1, 220e1, and 220ga. A sound pressure loss in the graph g3 may be less than that in the graph g4.

It will be apparent to those skilled in the art that the present disclosure can be embodied in other specific forms within the scope without departing from the spirit and essential features of the present disclosure.

Some embodiments or other embodiments of the present disclosure described above are not exclusive or distinct from each other. Some embodiments or other embodiments of the present disclosure described above can be used together or combined in configuration and/or function.

The above detailed description is merely an example and should not be to be understood as limiting the present disclosure. The scope of the present disclosure should be determined by rational interpretation of the appended claims, and all modifications within the equivalent range of the present disclosure are included in the scope of the present disclosure.

The invention claimed is:

1. A display device comprising:
  a display panel having a lower side;
  a speaker positioned in a rear of the display panel and adjacent to the lower side of the display panel, wherein the speaker is configured to provide a sound toward a lower half of the display panel; and
  a reflective plate covering the lower side and extending along the lower side, the reflective plate having an inner surface facing the speaker and including a step shape that protrudes from the inner surface and extends along the lower side, the reflective plate configured to reflect forward the sound provided by the speaker, wherein the reflective plate includes a first part facing the speaker and a second part that extends from a lower end of the first part and bends to a front of the first part.

2. The display device of claim 1, further comprising a cover coupled to a front surface of the reflective plate.

3. The display device of claim 2, wherein the step shape includes a first surface toward a front and a second surface that is connected to the first surface and faces the display panel.

4. The display device of claim 3, wherein the first surface and the second surface form a right angle.

5. The display device of claim 3, wherein the first surface and the second surface form an obtuse angle.

6. The display device of claim 3, wherein the first surface and the second surface are roundly connected.

7. The display device of claim 2, wherein the step shape further includes a plurality of step shapes,
wherein the plurality of the step shapes are spaced apart along a thickness direction of the display panel.

8. The display device of claim 7, wherein each step shape includes a third surface toward a front and a fourth surface that is connected to the third surface and faces the display panel,
wherein heights of the third surfaces are the same as each other.

9. The display device of claim 7, wherein each step shape includes a fifth surface toward a front and a sixth surface that is connected to the fifth surface and faces the display panel,
wherein a height of the fifth surface decreases as it goes to the front.

10. The display device of claim 7, wherein each step shape includes a seventh surface toward a front and an eighth surface that is connected to the seventh surface and faces the display panel,
wherein the eighth surfaces have the same depth in the thickness direction of the display device.

11. The display device of claim 7, wherein each step shape includes a ninth surface toward a front and a tenth surface that is connected to the ninth surface and faces the display panel,
wherein the tenth surface has an increasing depth in the thickness direction of the display device as it goes to the front.

12. The display device of claim 1, wherein the reflective plate includes a third part that extends from a lower end of the second part and bends to a front of the second part.

13. The display device of claim 1, wherein the reflective plate further includes:
a first side plate that extends from one end of the first part and bends to the front of the first part; and
a second side plate that extends from other end of the first part and bends to the front of the first part.

14. The display device of claim 13, wherein the reflective plate further includes a second step shape that protrudes from the first side plate to an inside of the reflective plate and extends along a boundary of the first part and the first side plate.

* * * * *